US011481706B2

(12) United States Patent
Tang et al.

(10) Patent No.: US 11,481,706 B2
(45) Date of Patent: Oct. 25, 2022

(54) AUTOMATIC ABNORMAL TREND DETECTION OF REAL TIME DRILLING DATA FOR HAZARD AVOIDANCE

(71) Applicant: Landmark Graphics Corporation, Houston, TX (US)

(72) Inventors: Hewei Tang, College Station, TX (US); Shang Zhang, Tulsa, OK (US); Feifei Zhang, Spring, TX (US); Suresh Venugopal, Spring, TX (US); Youli Mao, Houston, TX (US)

(73) Assignee: Landmark Graphics Corporation, Houston, TX (US)

( * ) Notice: Subject to any disclaimer, the term of this patent is extended or adjusted under 35 U.S.C. 154(b) by 144 days.

(21) Appl. No.: 16/649,249

(22) PCT Filed: Feb. 22, 2018

(86) PCT No.: PCT/US2018/019227
§ 371 (c)(1),
(2) Date: Mar. 20, 2020

(87) PCT Pub. No.: WO2019/094059
PCT Pub. Date: May 16, 2019

(65) Prior Publication Data
US 2020/0302353 A1     Sep. 24, 2020

Related U.S. Application Data

(60) Provisional application No. 62/584,464, filed on Nov. 10, 2017.

(51) Int. Cl.
*G06Q 10/06* (2012.01)
*E21B 21/08* (2006.01)
(Continued)

(52) U.S. Cl.
CPC ......... *G06Q 10/0635* (2013.01); *E21B 21/08* (2013.01); *E21B 44/00* (2013.01); *E21B 47/00* (2013.01); *G06Q 50/02* (2013.01)

(58) Field of Classification Search
CPC .... G06Q 10/0635; G06Q 50/02; E21B 21/08; E21B 44/00; E21B 47/00
See application file for complete search history.

(56) References Cited

U.S. PATENT DOCUMENTS 7,650,950 B2    1/2010  Leuchtenberg
7,762,131 B2    7/2010  Ibrahim et al.
(Continued)

FOREIGN PATENT DOCUMENTS

WO     2016/153636 A1    9/2016

OTHER PUBLICATIONS

Zhou, Quan, et al. "An improved gas kick detection method based on continuous Doppler ultrasonic wave in deep water drilling." Advances in Mechanical Engineering 9.8 (2017): 1687814017715424.
(Continued)

*Primary Examiner* — Dany E Akakpo
(74) *Attorney, Agent, or Firm* — Kilpatrick Townsend & Stockton LLP

(57) ABSTRACT

An abnormal trend detection system for detecting one or more hazards may provide for a safe and effective drilling operation as any of the one or more hazards may be avoided. Several indicators may be defined including a first, second, third and fourth indicator. The indicators are used to identify in a trend analysis abnormal trends. One or more thresholds may be defined. When a trend analysis indicates that a threshold has been reached or exceeded an alarm may be triggered, a drilling operation may be altered or a combination thereof.

17 Claims, 10 Drawing Sheets

(51) Int. Cl.
*E21B 44/00* (2006.01)
*E21B 47/00* (2012.01)
*G06Q 50/02* (2012.01)

(56) References Cited

U.S. PATENT DOCUMENTS

| | | |
|---|---|---|
| 9,670,767 B2 | 6/2017 | Hernandez et al. |
| 9,822,630 B2 | 11/2017 | Ring et al. |
| 2004/0040746 A1 | 3/2004 | Niedermayr et al. |
| 2010/0082256 A1 | 4/2010 | Mauldin et al. |
| 2012/0097450 A1 | 4/2012 | Wessling et al. |
| 2013/0299242 A1* | 11/2013 | Veeningen ............ E21B 47/113 175/50 |
| 2013/0341093 A1 | 12/2013 | Jardine et al. |
| 2015/0053483 A1 | 2/2015 | Mebane, III |
| 2015/0235544 A1 | 8/2015 | Hernandez et al. |
| 2016/0290121 A1* | 10/2016 | Wesley ................... E21B 47/09 |

OTHER PUBLICATIONS

Mickens, Roscoe, et al. "Automated Trend-Based Alerting Enhances Real-Time Hazard Avoidance" SPE/IADC Drilling Conference and Exhibition. Society of Petroleum Engineers, 2017.

Pritchard, David, Jesse Roye, and J. C. Cunha. "Trends in monitoring: How to use real-time data effectively." Journal of Petroleum Technology 64.01 (2012): 48-52.

Carpenter, Chris. "Stuck-Pipe Prediction with Automated Real-Time Modeling and Data Analysis." Journal of Petroleum Technology 68.06 (2016): 72-73.

International Search Report and Written Opinion issued in related PCT Application No. PCT/US2018/019227 dated Aug. 9, 2018, 11 pages.

* cited by examiner

AUTOMATIC ABNORMAL TREND DETECTION OF REAL TIME DRILLING DATA FOR HAZARD AVOIDANCE

CROSS-REFERENCE TO RELATED APPLICATION

The present application is a U.S. National Stage Application of International Application No. PCT/US2018/019227 filed Feb. 22, 2018, which claims benefit of U.S. Provisional Patent Application No. 62/584,464 filed Nov. 10, 2017, both of which are incorporated herein by reference in their entirety for all purposes.

TECHNICAL FIELD

The present invention relates to abnormal trend detection and analysis, and more particularly to abnormal trend detection and analysis for real-time drilling data analysis, for example, in hydrocarbon exploration and recovery applications.

BACKGROUND

Detection and avoidance of abnormal behaviors, conditions or hazards during a hydrocarbon operation provides a safe and efficient environment for the recovery of hydrocarbons. The present disclosure relates generally to abnormal trend detection and analysis for real-time drilling data, for example, drilling data associated with a hydrocarbon, such as oil and gas, exploration, production or recovery application. During a specific drilling operation, the avoidance of hazards is necessary to provide a safe and effective drilling operation. Current drilling hazard avoidance systems are generally physically based models. These physically based models have a lot of limitations in application, such as (a) physical models usually require high quality data input, (b) physical models are based on specific assumptions with a limited application scope, and (c) physical model based systems usually require large computational costs. Optimization of abnormal trend detection is needed to provide effective and efficient trend analysis, for example, to avoid hazards in hydrocarbon exploration and recovery drilling operations.

Current data driven models also have several drawbacks. For example, hydrocarbon operations may comprise one or more sensors disposed on or about equipment or at a site. Data from these sensors may contain a lot of noise such that the data is not easily analyzed or does not provide useful information to detect or avoid a hazard during a hydrocarbon operation. For example, the data may contain noise such that a trend cannot be determined as the analysis of the data does not provide a trend indicative of abnormal behavior but rather depicts a trend indicative of the noise. Further, current abnormal behavior, condition or hazard detection methods rely on a difference between a peak value and a predicted value. This predicted value may be unreliable and thus provide inaccurate information.

Thus, a reliable abnormal behavior, condition or hazard detection for a hydrocarbon operation is needed. The present invention provides such reliable detection by applying specific models to time-series data to obtain a probability value which yields reliable information for an abnormal trend analysis.

Figure 1:
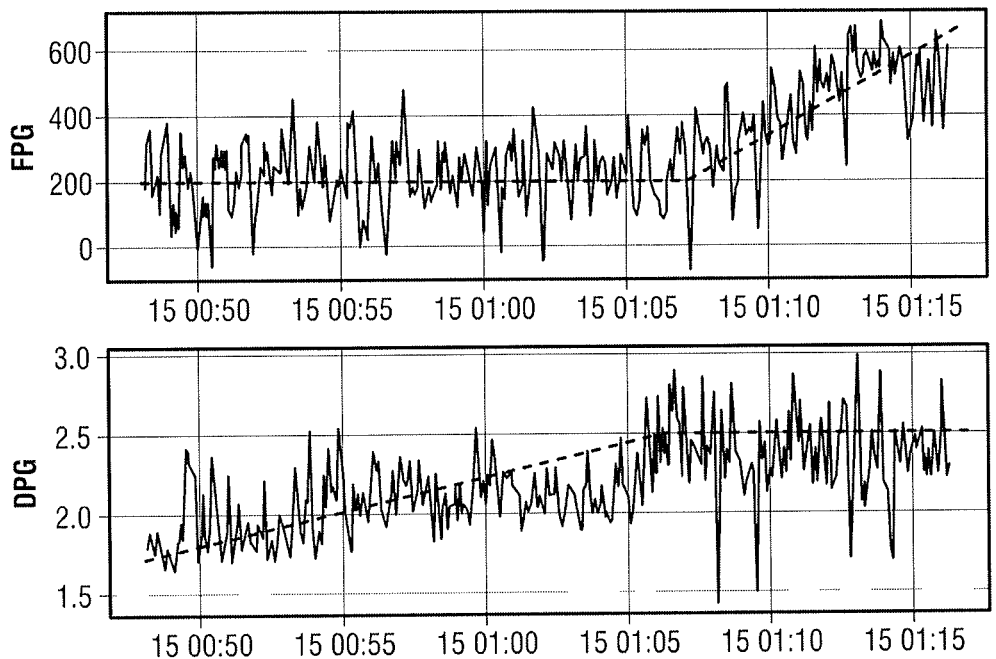
FIG. 1 is a graph illustrating two real-time kick indicators calculated from real-time drilling data, according to one or more aspects of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

Illustrative embodiments of the present invention are described in detail herein. In the interest of clarity, not all features of an actual implementation are described in this specification. It will of course be appreciated that in the development of any such actual embodiment, numerous implementation specific decisions must be made to achieve the specific implementation goals, such as compliance with system related and business related constraints, which may vary from one implementation to another. Moreover, it will be appreciated that such a development effort might be complex and time-consuming, but would nevertheless be a routine undertaking for those of ordinary skill in the art having the benefit of the present disclosure. Furthermore, in no way should the following examples be read to limit, or define, the scope of the disclosure.

For any one or more exploration, service, production operations or any combination thereof at an identified reservoir or site, drilling data may be obtained. This data may be obtained by an information handling system in real-time and stored in a database located internal to or external to the information handling system. For a given operation or site, a drilling hazard avoidance system or an abnormal trend detection system may be necessary to provide a safe and efficient drilling operation, for example, for a hydrocarbon drilling exploration, service, production or recovery operation associated with a well, reservoir or site. Current physically based models for abnormal trend detection are generally or mainly physically based and have several limitations in application. For example, current physically based models for drilling hazard avoidance require high quality data input, that all physical models are based on specific assumptions with a limited application scope, and large computational costs.

Wells, also referred to as wellbores, are drilled to reach underground petroleum and other subterranean hydrocarbons. Information or data associated with a hydrocarbon operation is obtained, for example, during, after or both a drilling operation. This information or data may relate to parameters, conditions or both associated with the surface, downhole or both. In one or more embodiments, modular hardware and software units may be communicatively coupled to one or more sensors, controls or both that are coupled, directly or indirectly, to equipment above or below the surface at a site, such as, a hydrocarbon operation site. One or more parameters associated with a hydrocarbon operation, such as, a drilling operation, may be recorded in a real time manner at any time interval (for example, a preset or predetermined time, random time, or any other time interval) or depth interval. Such information may include, for example, data associated with any operation at a site including, but not limited to, information associated with a rig or any other equipment at a site, characteristics of one or more earth formations traversed by the wellbore, size and configuration of the wellbore, one or more environmental factors (such as, one or more of temperature, humidity, release of gases, vapor, fluids or other materials and any other factors). The collection of information relating to conditions at the surface and downhole, commonly referred to as "data log," can be performed by several methods described further below.

Data or information collected at a site may be used in one or more embodiments, to detect, avoid or both one or more abnormal behaviors, conditions or hazards (collectively referred to as abnormal conditions). In any one or more embodiments, one or more abnormal conditions may comprise any one or more of formation kick, drill pipe stuck, loss of drilling fluid circulation, wellbore ballooning, wellbore failure, stick-slip, drill string buckling, or any other abnormal condition. For example, formation kick ("kick") is the undesired flow of formation fluid into a wellbore when wellbore hydrostatic pressure is less than a formation pore pressure. Detection, control or both of formation kick is required to prevent harm to the surrounding environment or personnel, for example, due to a blowout. A kick may be observed by a drilling operator or engineer using one or more indicators of a kick. However, such kick indicators may be difficult to apply and may require substantial field experience by personnel to determine that a kick has occurred. In one or more embodiments, a robust and reliable abnormal trend detection in real-time data is provided. First, the real-time trend is defined. Second, one or more smoothing techniques, probability analysis or both are applied to account for the local abnormal trends resulting from fluctuations and outliers in real world data.

In one or more embodiments, an abnormal trend detection system for detecting one or more hazards may provide for a safe and effective drilling operation as any of the one or more hazards may be avoided. Several indicators may be defined including a first, second, third and fourth indicator. The indicators are used to identify in a trend analysis abnormal trends. One or more thresholds may be defined. When a trend analysis indicates that a threshold has been reached or exceeded an alarm may be triggered.

The present disclosure provides one or more embodiments for a drilling hazard avoidance system or an abnormal trend detection system that allows for detecting an abnormal data trend automatically in real-time. Any one or more embodiments present a general abnormal trend detection algorithm for real-time drilling data analysis, which can be incorporated into a drilling management system, real-time data monitoring system, any other hazard avoidance system, or any combination thereof. In one or more embodiments, the drilling hazard avoidance system accounts for one or more uncertainties in real-time data like fluctuations and outliners so that real-time data from, for example, a drilling rig, may be directly handled. As the drilling hazard avoidance system according to one or more aspects of the present disclosure is data driven, no limitations are placed on physical application scope and also the system provides a simple and fast approach to drilling hazard avoidance. Thus, the drilling hazard avoidance system may be effectively and efficiently utilized in any real-time alert system for hazard avoidance and drilling management.

Figure 6:
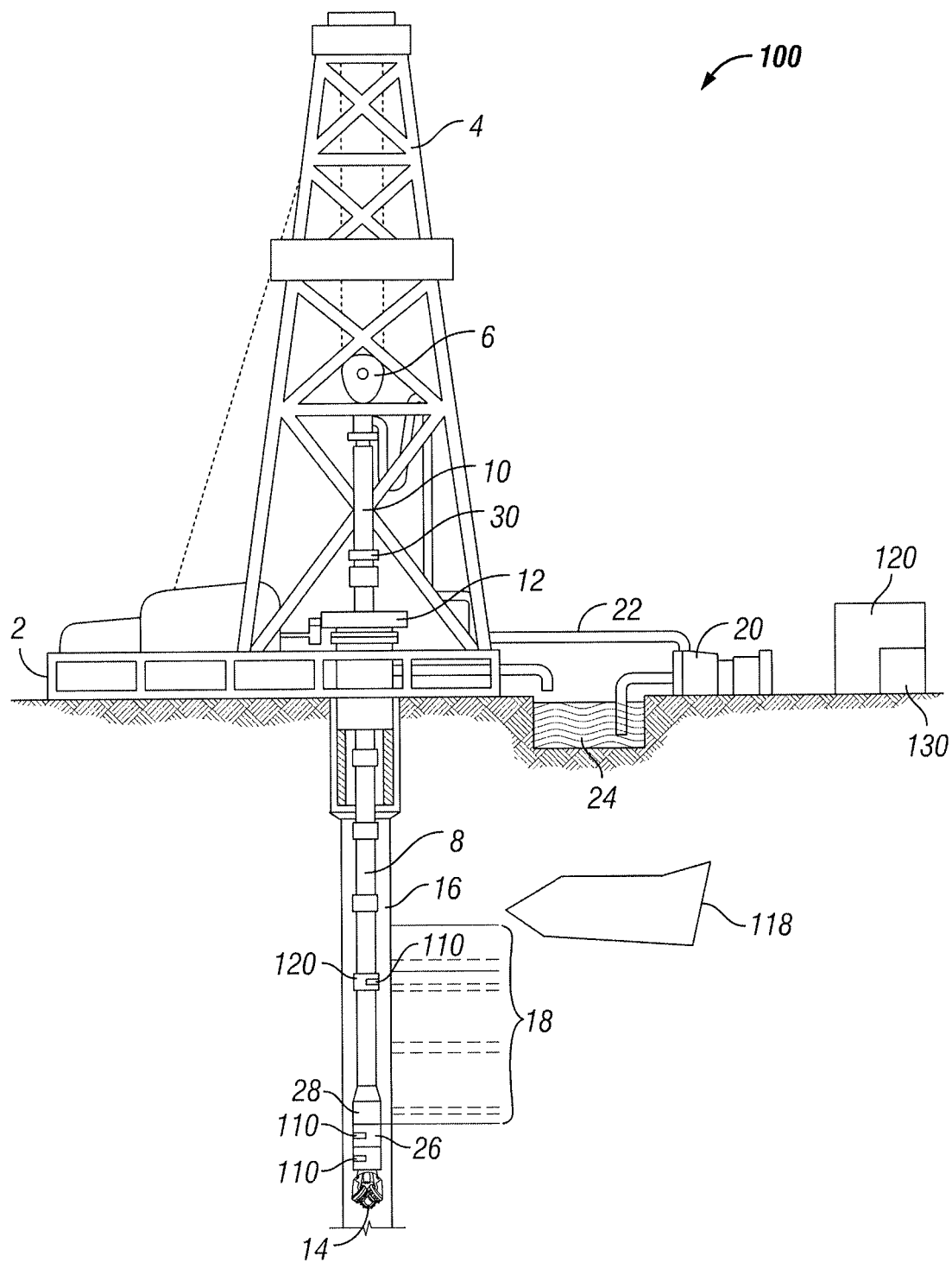
FIG. 6 illustrates an example abnormal trend analysis system in accordance with one or more aspects of the present invention.

Techniques for measuring conditions or operating parameters at the surface and downhole and the movement and position of a drilling assembly, contemporaneously with the drilling of the well, may be referred to as "measurement-while-drilling" techniques, or "MWD" as mentioned herein. The measurement of formation properties by a given MWD system (for example, as illustrated in FIG. 6), during drilling of a wellbore into a subterranean formation, can improve the timeliness of receiving measurement data and, as a result, be utilized by implementations described herein to detect an abnormal condition, such as formation kick, during the drilling operation. Similar techniques, concentrating more on the measurement of formation parameters of the type associated with wireline tools, have been referred to as "logging while drilling" techniques, or "LWD." While distinctions between MWD and LWD may exist, the terms MWD and LWD often are used interchangeably. For the purposes of explanation in this disclosure, the term drilling data log will be used with the understanding that the term MWD encompasses surface measurements, MWD and LWD techniques.

To facilitate a better understanding of the present invention, the following examples of certain embodiments are given. In no way should the following examples be read to limit, or define, the scope of the invention. One or more embodiments of the present disclosure may be applicable to any type of drilling operation including, but not limited to, exploration, services or production operation for any type of well site or reservoir environment including subsurface and subsea environments.

According to one or more aspects of the present disclosure, an information handling system or computer equipment may be required. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, read only memory (ROM), or any other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. The information handling system may also include one or more interface units capable of transmitting one or more signals to a controller, actuator, or like device.

For the purposes of this disclosure, computer-readable media of an information handling system may comprise any instrumentality or aggregation of instrumentalities that may retain data and/or instructions for a period of time. Computer-readable media may include, for example, without limitation, storage media such as a direct access storage device (for example, a hard disk drive or floppy disk drive), a sequential access storage device (for example, a tape disk drive), compact disk (CD), CD read only memory (CD-ROM), digital video disc (DVD), the "CLOUD", RAM, ROM, electrically erasable programmable read-only memory (EEPROM), flash memory, biological memory, deoxyribonucleic acid (DNA) or molecular memory or any combination thereof, as well as communications media such wires, optical fibers, microwaves, radio waves, and other electromagnetic and/or optical carriers, and/or any combination of the foregoing.

According to one or more embodiments of the present disclosure, two challenges for abnormal trend detection in real-time data are resolved. The first is to define the trend in real-time. The second is to apply the smoothing techniques and probability analysis to account for the local abnormal trends resulted from fluctuations and outliners (or outliers) in real world data. In one or more embodiments, any one or more defined trend indicators, for example, the below defined four trend indicators, may be utilized or applied in a real-time automatic abnormal trend detection system. Real-life or real-time drilling data, for example, drilling data from an offshore rig, may be used along with one or more algorithms being applied into a real-time alarming system for kick detection according to one or more embodiments.

FIG. 1 illustrates a real-time record of two major indicators (kick indicators or trend indicators) for gas kick during rotating drilling operations. One indicator, for example, a first kick indicator, is named FPG (flow parameter group), which integrates flow related parameters like or including, but not limited to, flow in, stand pipe pressure (SPP), and flow out. The other indicator, for example, a second kick indicator, is named DPG (drilling parameter group), which integrates one or more drilling related parameters including, but not limited to, rate of penetration (ROP), rotary speed (RPM) and weight on bit (WOB). When kick happens, FPG will present an abnormal increasing trend (as indicated by the FPG solid line), and DPG will present a slowing-down accelerating trend (as indicated by the DPG solid line). The dashed lines for the FPG and DPG graphs are indicative of best-fit models. The x-axis represents time in the format of Day Hour:Minutes. The y-axis for FPG represents gallons per minute (GPM) and the y-axis for DPG is dimensionless.

Figure 2:
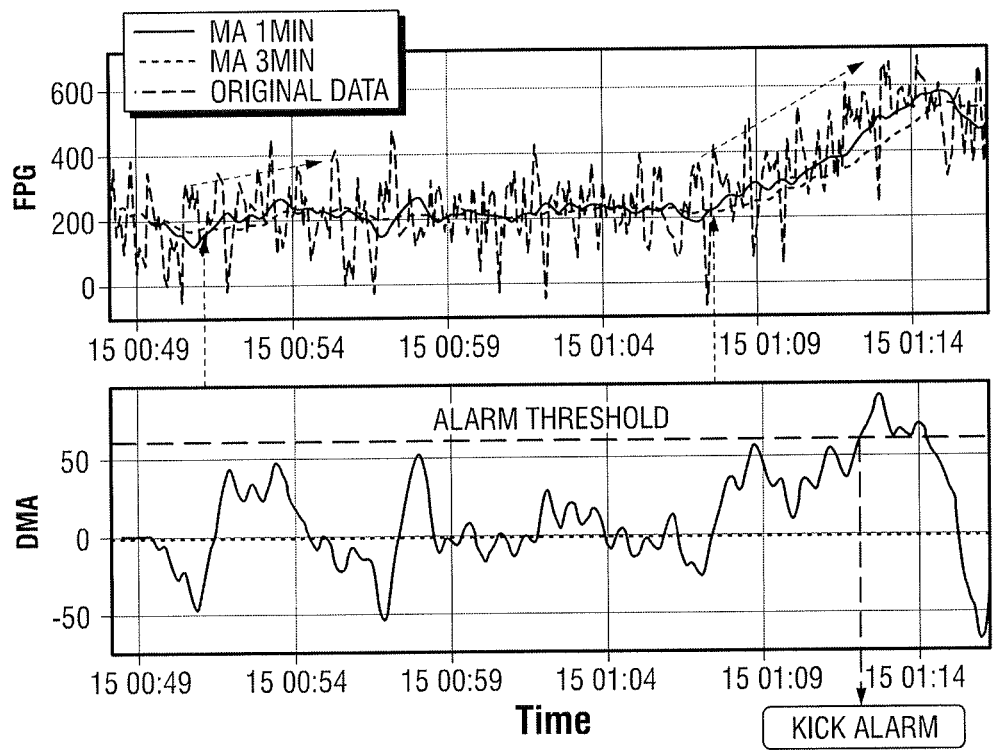
FIG. 2 is a graph illustrating real-time abnormal increasing trend detecting process, according to one or more aspects of the present disclosure.

FIG. 2 illustrates that for the abnormal increasing trend detection, DMA is calculated in real-time based on the FPG data. The upward crossover of MA values creates positive DMA value, indicating the FPG is increasing recently or indicative of a recent increasing trend of FPG plotted for a specified time interval or period. Two window sizes are utilized, for example, a window size of one minute (illustrated by the line MA 1 min) and a window size of three minutes (illustrated by the line MA 3 min). The dashed arrows in the FPG graph of FIG. 2 are indicative of an upward trend. The dashed line in the FPG graph is indicative of an upward trend. The solid line in the FPG graph is indicative of a normalization or smoothness of the data. The x-axis represents time in the format of Day Hour:Minutes. The y-axis for FPG represents gallons per minute (GPM) and the y-axis for DPG is dimensionless. In one or more embodiments, a threshold may be applied to set out, trigger, or otherwise indicate the alarm for kick detection. In one or more embodiments, a threshold may be set, predetermined or predefined for any one or more trend indicators based, at least in part, on historical data or information, user-defined inputs, one or more criteria associated with a drilling site or operation, any other factor or criteria, or any combination thereof.

Figure 3:
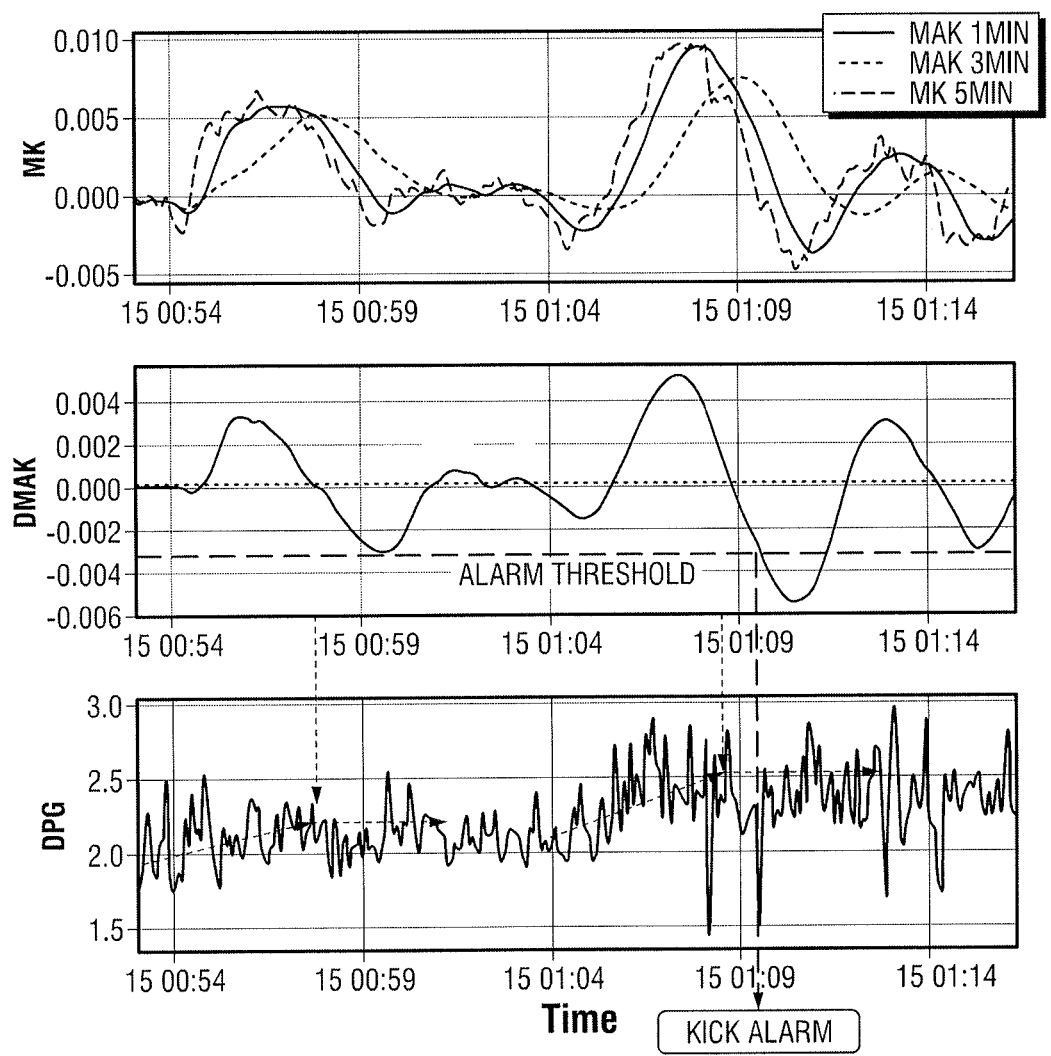
FIG. 3 is a graph illustrating real-time slowing-down accelerating trend detecting process, according to one or more aspects of the present disclosure.

FIG. 3 is a graph illustrating the real-time slowing-down accelerating trend detection process. Such a trend detection may be automatic or manual. The MK value of DPG is first calculated with a window size, for example, of five minutes (illustrated by the line MK 5 min), in real-time. Then real-time MAK values are calculated from MK for a window size of, for example, approximately one minute (illustrated by the line MAK 1 min) and three minutes (illustrated by the line MAK 3 min), respectively. In one or more embodiments, a window size may be based on the criteria or factors for a given drilling operation and may be any range of time. The DMAK value is finally calculated. A downward crossover of MKA value creates negative DMAK value, indicating that the data has recently been rising at a slower rate than it has in the past or at a slower rate than a historical rate. This downward trend may be indicative of an abnormal condition. The solid arrows in FIG. 3 are indicative of the DPG trend during the time series illustrated. The dashed arrows of the DPG graph are indicative of the local decreasing and increasing trends. The two dashed arrows from the DMAK graph to the DPG plot are indicative of when the DMAK value becomes negative—that a local decreasing and increasing trend of DPG is detected. A threshold can be applied to set out the alarm for kick detection. A threshold may be set, predetermined or predefined based, at least in part, on historical data or information, user-defined inputs, one or more criteria associated with a drilling site or operation, any other factor or criteria, or any combination thereof.

In one or more embodiments, an alarm may be triggered based, at least in part, on a trend analysis as illustrated in any one or more of FIGS. 1-3. Triggering an alarm may comprise depicting an alarm condition, for example, depicting an alarm condition as illustrated in FIGS. 1-3 to a display of an information handling system, communicating that an alarm condition has occurred to one or more information handling systems including, but not limited to, a server, a computer, a laptop, a tablet, a cellular device, or any other electronic device, sounding an alarm, any other method of notification of an alarm, or any combination thereof.

Figure 4:
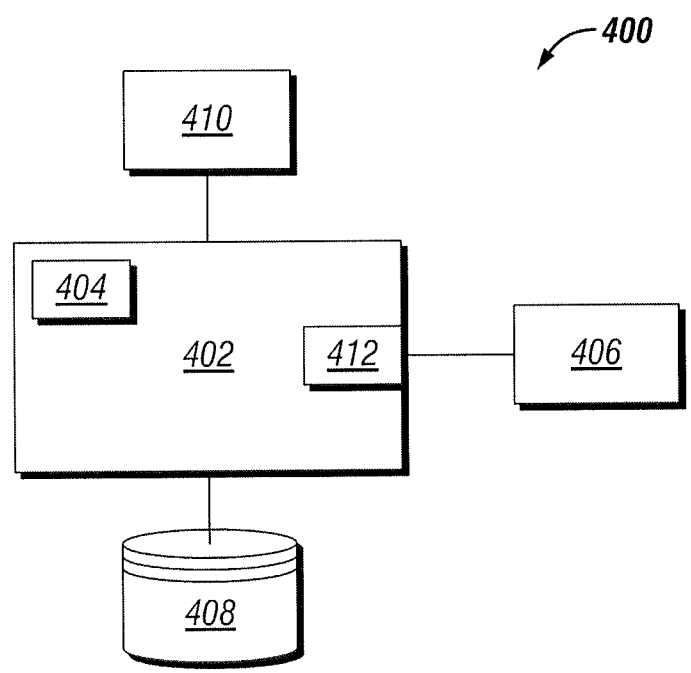
FIG. 4. is a diagram illustrating an example abnormal trend detection system, according to one or more aspects of the present disclosure.

FIG. 4 is a diagram illustrating an example abnormal trend detection system 400, according to one or more aspects of the present disclosure. The abnormal trend detection system 400 may comprise one or more information handling systems 402. An information handling systems 402 may couple to a display 410, source 406 and database 408. Display 410 may display information, for example, any abnormal trend analysis, to a user. Information handling system 402 may be located local to or remote from source 406. Source 406 may be any drilling apparatus including, but not limited to, a rig such as a drilling rig associated with a hydrocarbon operation such as exploration, recovery or production. Source 406 may be located at a subterranean or offshore/subsea drilling site. Information handling system 402 may receive drilling data 412 from source 406. Source 406 may transmit drilling data 412 to information handling system 402 directly, indirectly, wired, wireless or any combination thereof. In one or more embodiments, source 406 may transmit drilling data 412 in real-time to information handling system 402. In one or more embodiments, information handling system 402 may request drilling data 412 from the source 406, receive automatically drilling data 412 from the source 406 or any combination thereof. Database 408 may be located local to or remote from information handling system 402. In one or more embodiments information handling system 402 comprises database 408. In one or more embodiments, another information handling system 402 comprises database 408. Database 408 may store any information or data received by the information handling system 402, for example, drilling data 412, store any historical information or data associated with source 406 or any other source of information or data, store any current or historical trend analysis performed or determined by information handling system 402, store any historical trend analysis associated with any drilling site from any source, computing device, storage device, other collector of information, or any combination thereof.

In one or more embodiments, any one or more information handling systems 402 may comprise a module 404. Module 404 may comprise hardware, software or any combination thereof for performing any one or more aspects of the present disclosure including, but not limited to, defining any one or more trend indicators, processing drilling data 412 received from source 404, storing drilling data 412 received from source 406, sending, receiving or both drilling data 412 to/from database 408, performing one or more calculations, for examples, Equations 1-5, applying any one or more of the defined trend indicators to determine real-time automatic abnormal trend detection as discussed with respect to FIGS. 1-3, setting a threshold, determining if a threshold has been reached, exceeded, not reached, or any combination thereof, providing information to a display 410 associated with a trend analysis, for example, any one or more illustrations as depicted in FIGS. 1-3, application of one or more smoothing techniques, performing a probability analysis and providing an interface for communicating over various networks, such as Wi-Fi, Bluetooth, RF, wired, or wireless communication systems. In one or more embodiments, information handling system 402 is not coupled to source 406 and instead detects or determines one or more abnormal trends based, at least in part, on offline data. In one or more embodiments, information handling system 402 may detect or determines one or more abnormal trends based, at least in part, on online data or real-time data, offline data, or both.

Figure 5:
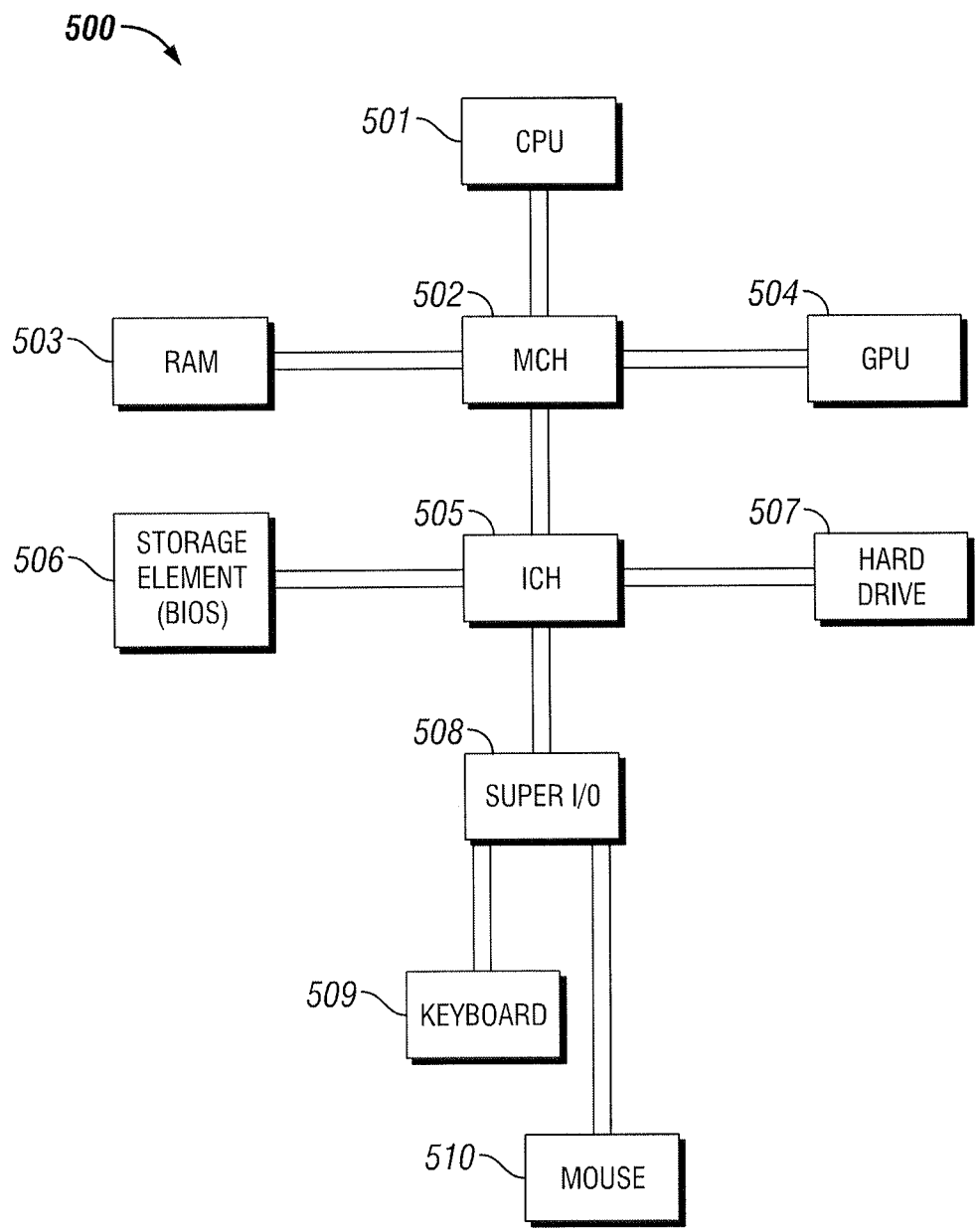
FIG. 5 is a diagram illustrating an example information handling system, according to one or more aspects of the present disclosure.

FIG. 5 is a diagram illustrating an example information handling system 500, according to one or more aspects of the present disclosure. The information handling system 402 in FIG. 4 may take a form similar to the information handling system 500 or include one or more components of information handling system 500. Any information handling system and any component discussed that includes a processor may take a form similar to the information handling system 500 or include one or more components of information handling system 500. A processor or central processing unit (CPU) 501 of the information handling system 500 is communicatively coupled to a memory controller hub (MCH) or north bridge 502. The processor 501 may include, for example a microprocessor, microcontroller, digital signal processor (DSP), application specific integrated circuit (ASIC), or any other digital or analog circuitry configured to interpret, execute program instructions, process data, or any combination thereof. Processor (CPU) 501 may be configured to interpret and execute program instructions or other data retrieved and stored in any memory such as memory 503 or hard drive 507. Program instructions or other data may constitute portions of a software or application for carrying out one or more methods described herein. Memory 503 may include read-only memory (ROM), random access memory (RAM), solid state memory, or disk-based memory. Each memory module may include any system, device or apparatus configured to retain program instructions, program data, or both for a period of time (for example, computer-readable non-transitory media). For example, instructions from a software or application may be retrieved and stored in memory 503, for example, a non-transitory memory, for execution by processor 501.

Modifications, additions, or omissions may be made to FIG. 5 without departing from the scope of the present disclosure. For example, FIG. 5 shows a particular configuration of components of information handling system 500. However, any suitable configurations of components may be used. For example, components of information handling system 500 may be implemented either as physical or logical components. Furthermore, in some embodiments, functionality associated with components of information handling system 500 may be implemented in special purpose circuits or components. In other embodiments, functionality associated with components of information handling system 500 may be implemented in configurable general purpose circuits or components. For example, components of information handling system 500 may be implemented by configured computer program instructions.

Memory controller hub (MCH) 502 may include a memory controller for directing information to or from various system memory components within the information handling system 500, such as memory 503, storage element 506, and hard drive 507. The memory controller hub 502 may be coupled to memory 503 and a graphics processing unit (GPU) 504. Memory controller hub 502 may also be coupled to an I/O controller hub (ICH) or south bridge 505. I/O controller hub 505 is coupled to storage elements of the information handling system 500, including a storage element 506, which may comprise a flash ROM that includes a basic input/output system (BIOS) of the computer system. I/O controller hub 505 is also coupled to the hard drive 507 of the information handling system 500. I/O controller hub 505 may also be coupled to a Super I/O chip 508, which is itself coupled to several of the I/O ports of the computer system, including keyboard 509 and mouse 510. Mouse 510 may, in one or more embodiments, comprise any one or more input elements able to receive conventional input from a user. This conventional input can include, for example, a push button, touch pad, touch screen, wheel, joystick, keyboard, mouse, keypad, or any other such device or element whereby a user can input a command to the device.

Figure 11:
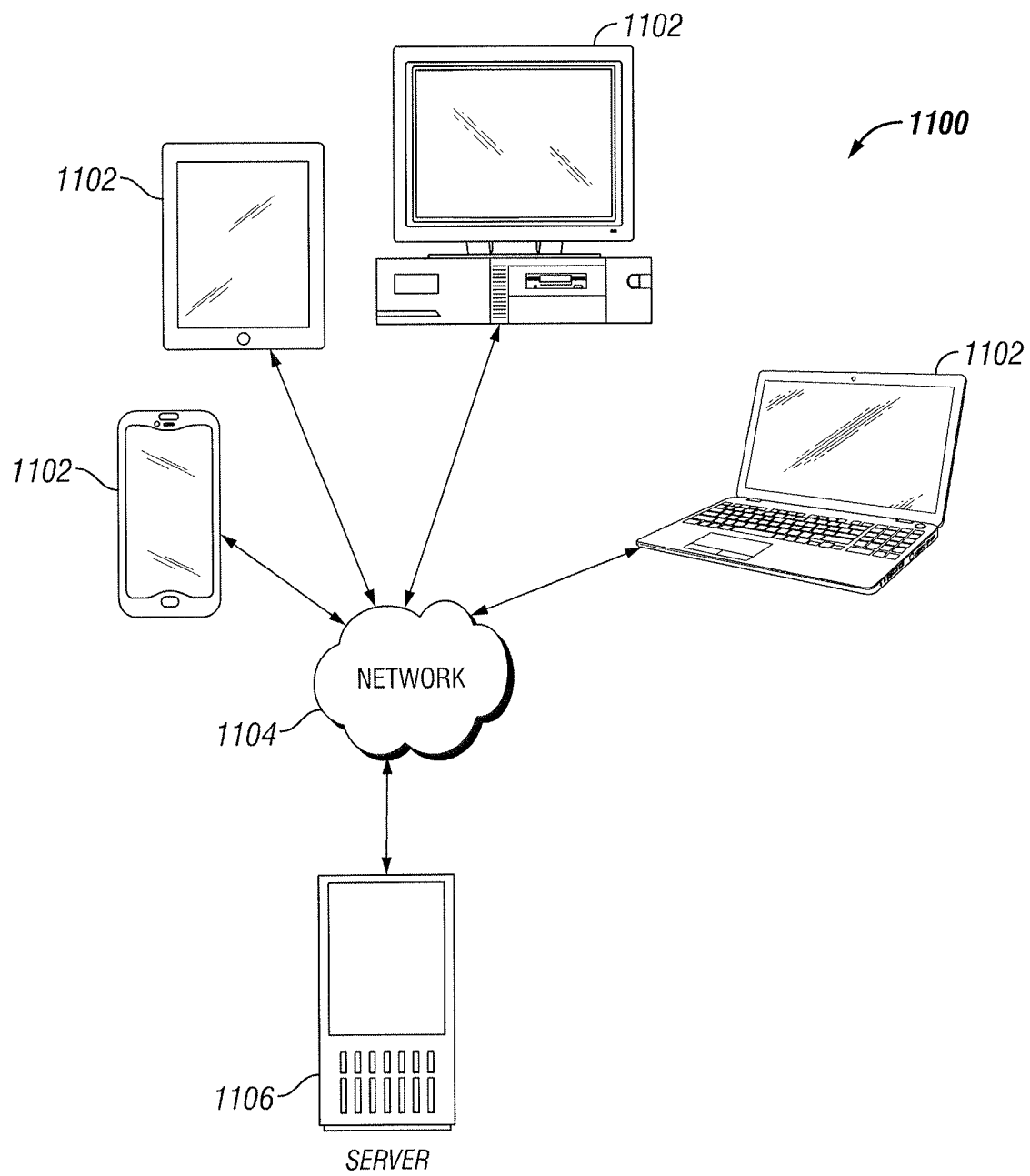
FIG. 11 illustrates a schematic diagram of an example of an abnormal trend detection environment in accordance with one or more aspects of the present invention.

In certain embodiments, the client device 1102 and the server 1106 of FIG. 11 may comprise an information handling system 500 with at least a processor and a memory device coupled to the processor that contains a set of instructions that when executed cause the processor to perform certain actions. In one or more embodiments, an information handling system 500 may comprise at least a processor and a memory device coupled to the processor that contains a set of instructions that when executed cause the processor to perform certain actions. In any embodiment, the information handling system may include a non-transitory computer readable medium that stores one or more instructions where the one or more instructions when executed cause the processor to perform certain actions. As used herein, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a computer terminal, a network storage device, or any other suitable device and may vary in size, shape, performance, functionality, and price. The information handling system 500 may include random access memory (RAM), one or more processing resources such as a central processing unit (CPU) or hardware or software control logic, read only memory (ROM), or any other types of nonvolatile memory. Additional components of the information handling system may include one or more disk drives, one or more network ports for communication with external devices as well as various I/O devices, such as a keyboard, a mouse, and a video display. The information handling system 500 may also include one or more buses operable to transmit communications between the various hardware components.

FIG. 6 illustrates an example illustrates an example abnormal trend analysis system in accordance with one or more aspects of the present invention including a drilling environment or site 100 for drilling a well, also referred to as a wellbore. As shown, a drilling platform 2 supports a derrick 4 having a traveling block 6 for raising and lowering a drill string 8. A kelly 10 supports the drill string 8 as it is lowered through a rotary table 12. A drill bit 14 is driven by a downhole motor and/or rotation of the drill string 8. As the bit 14 rotates, it creates a wellbore 16 that passes through various formations 18. A pump 20 circulates drilling fluid through a feed pipe 22 to kelly 10, through the interior of drill string 8, through orifices in drill bit 14, back to the surface (for example, areas accessible without entering the wellbore) via the annulus around drill string 8, and into a retention pit 24. The drilling fluid transports cuttings from the wellbore into the pit 24.

Data logging operations can be performed during drilling operations. In an example, drilling can be carried out using a string of drill pipes connected together to form the drill string 8 that is lowered through the rotary table 12 into the wellbore. The drilling rig 100 at the surface supports the drill string 8, as the drill string 8 is operated to drill a wellbore penetrating the subterranean region. The top drive rotates the drill string end bit without the use of a kelly and rotary table. Blowout preventer is one or more valves installed at the wellhead to prevent the escape of pressure either in the annular space between the casing and the drill pipe or in open hole (for example, hole with no drill pipe) during drilling or completion operations. Mud pump is a large reciprocating pump used to circulate the mud (drilling fluid) on a drilling rig. Mud pits are a series of open tanks, usually made of steel plates, through which the drilling mud is cycled to allow sand and sediments to settle out. Additives are mixed with the mud in the pit, and the fluid is temporarily stored there before being pumped back into the well. Mud pit compartments are also called shaker pits, settling pits, and suction pits, depending on their main purpose. In an example, the drill string 8 may include, for example, a kelly, drill pipe, a bottom hole assembly, and/or other components. The bottom hole assembly on the drill string 8 may include drill collars, drill bits, one or more logging tools, and other components. The drilling data logging tools may include pressure sensors, flow measurement sensors, load sensors, at the mud pump, drill string, mud pit, blowout preventer; measuring while drilling (MWD) tools; logging while drilling (LWD) tools; and others.

As illustrated in FIG. 6, one or more MWD instruments are integrated into a logging tool 26 located near the bit 14. As the bit 14 extends the wellbore through the formations 18, the logging tool 26 concurrently collects measurements or data relating to various formation properties as well as the bit position and various other drilling conditions, drilling parameters or both. In one or more embodiments, the logging tool 26 may take the form of a drill collar (for example, a thick-walled tubular that provides weight and rigidity to aid the drilling process) that is positioned close to the drill bit 14. A telemetry sub 28 (for example, a transceiver) may be coupled to the logging tool 26 to transfer measurements from logging tool 26 to a surface transceiver 30, to receive commands from the surface transceiver 30 or both. Additionally, in one or more embodiments, sensors or transducers 110 are located at the lower end of the drill string 8. In one or more embodiments, sensors 110 may be located at any location along the drill string 8, for example, disposed at, on or about the logging tool 26 or a collar 112. While a drilling operation is in progress one or more sensors 110 may continuously monitor one or more drilling parameters, one or more formation conditions, any other downhole parameter or condition or any combination thereof and may transmit corresponding information or data to a surface detector (for example, the surface transceiver 30, a logging facility 120, an information handling system 130 or any other data collection device) by some form of telemetry. In one or more embodiments, logging facility 120 may comprise an information handling system 130. One or more of logging facility 120 and information handling system 130 may be located at or remote from drilling environment 100. In one or more embodiments, logging facility 120, information handling system 130 or both may be communicatively coupled directly or indirectly to telemetry device 28, logging tool 26, sensors 110 or any combination thereof.

One or more abnormal conditions may arise during a hydrocarbon operation including, but not limited to a drilling operation, a completion process or both. One such abnormal condition may be a formation kick ("kick"). A kick may occur when the fluid (for example, a liquid or a gas) in a reservoir 118 of a formation 18 prematurely enters a portion of a wellbore 16, for example, in an annular space of the wellbore 16. A sufficient wellbore pressure must be exerted on the formation 18 to prevent the formation fluids from prematurely entering the wellbore 18. Wellbore pressure refers to the pressure exerted by a fluid due to the force of gravity, external pressure, friction or any combination thereof. If the pressure exerted by the fluid is not sufficient, then a kick may occur.

Detecting a kick as early as possible may reduce the risk of blowout, reduce the difficulty of well control, increase productivity time and efficiency of operation of a drilling environment 100, prevent equipment failure caused by high pressure during well control, and improve the safety margin for a hydrocarbon operation. However, one or more kick indicators may be difficult to analyze and may require extensive field experience to accurately detect a kick. One or more kick indicators may include, but are not limited to, a flow rate increase (for example, flow out is greater than flow in), a pit volume increase, a pump pressure decrease (for example, stand pipe pressure decrease), a string weight change (for example, weight on bit decrease), a drilling break (for example, sudden increase in rate of penetration) or any combination thereof.

One or more embodiments provide for robust early abnormal condition detection, for example, kick detection, utilizing a drilling parameter for example, a d-exponent, which is based, at least in part, on real-time measurement data obtained through surface data logging, MWD, techniques, LWD techniques or any combination thereof, one or more kick indicators or any combination thereof. As used herein, "real-time" data refers to data that is measured while a drilling operation is concurrently taking place and measurements from the concurrent drilling operation are being utilized by the robust early kick detection algorithm. A plurality of trend indicators for robust early kick detection may be determined without utilizing additional specialized equipment during a drilling operation.

The following discussion describes, in further detail, example flowcharts for a process for robust early kick detection during a drilling operation and a process that detects a drilling operation using at least in part real-time drilling data, and example diagrams illustrating kick detection based on determined trend indicators.

Figure 7:
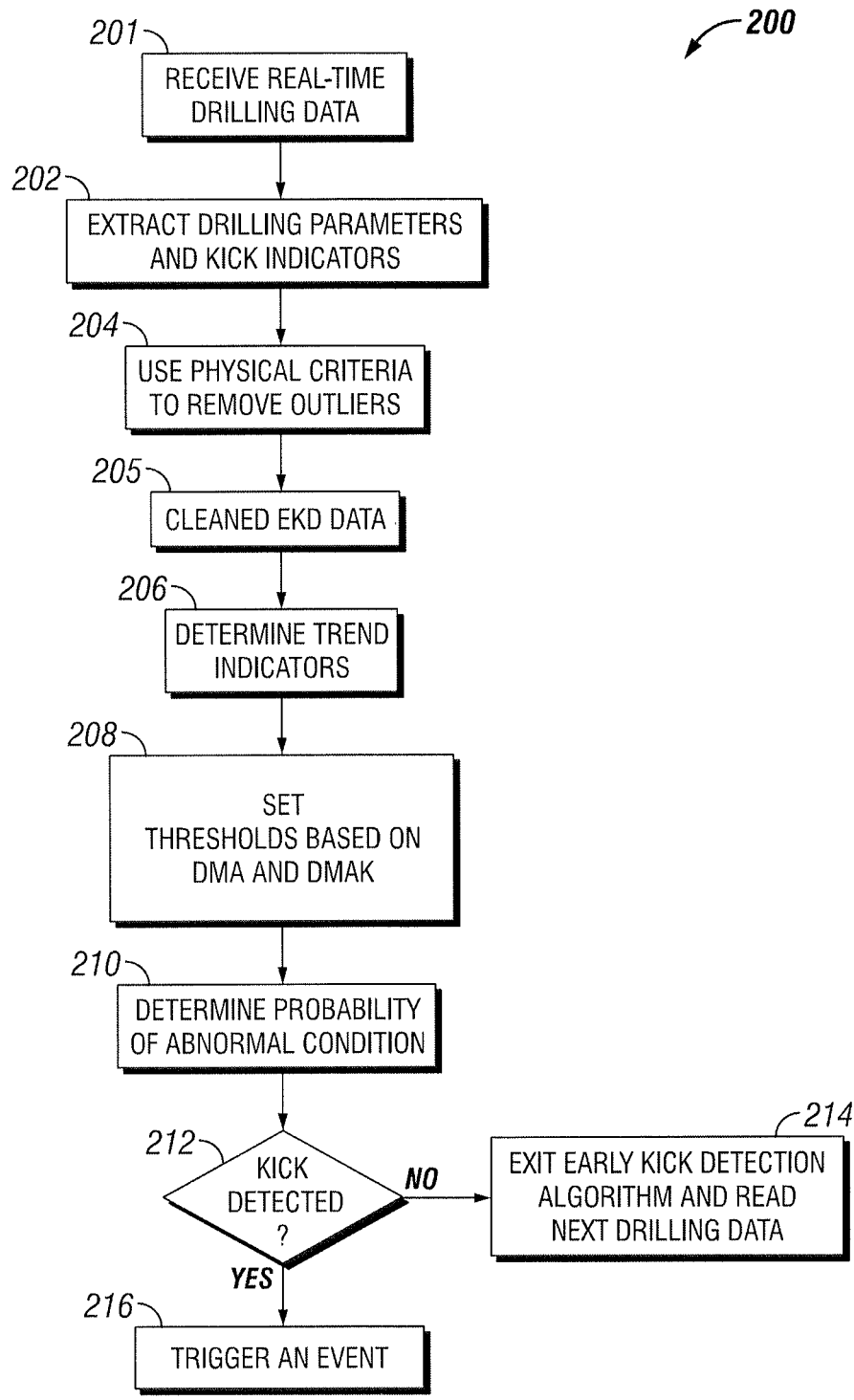
FIG. 7 is a flow chart for abnormal trend analysis of data in accordance with one or more aspects of the present invention.

FIG. 7 is a flow chart for an abnormal trend analysis method 200 of data in accordance with one or more aspects of the present invention. In particular, the abnormal trend analysis method 200 provides robust early kick detection utilizing real-time drilling data. Any one or more steps of the method 200 may be implemented by one or more information handling systems, such as a processor 638 described in FIG. 9, information handling system 500 described in FIG. 5, or any combination thereof.

Figure 8:
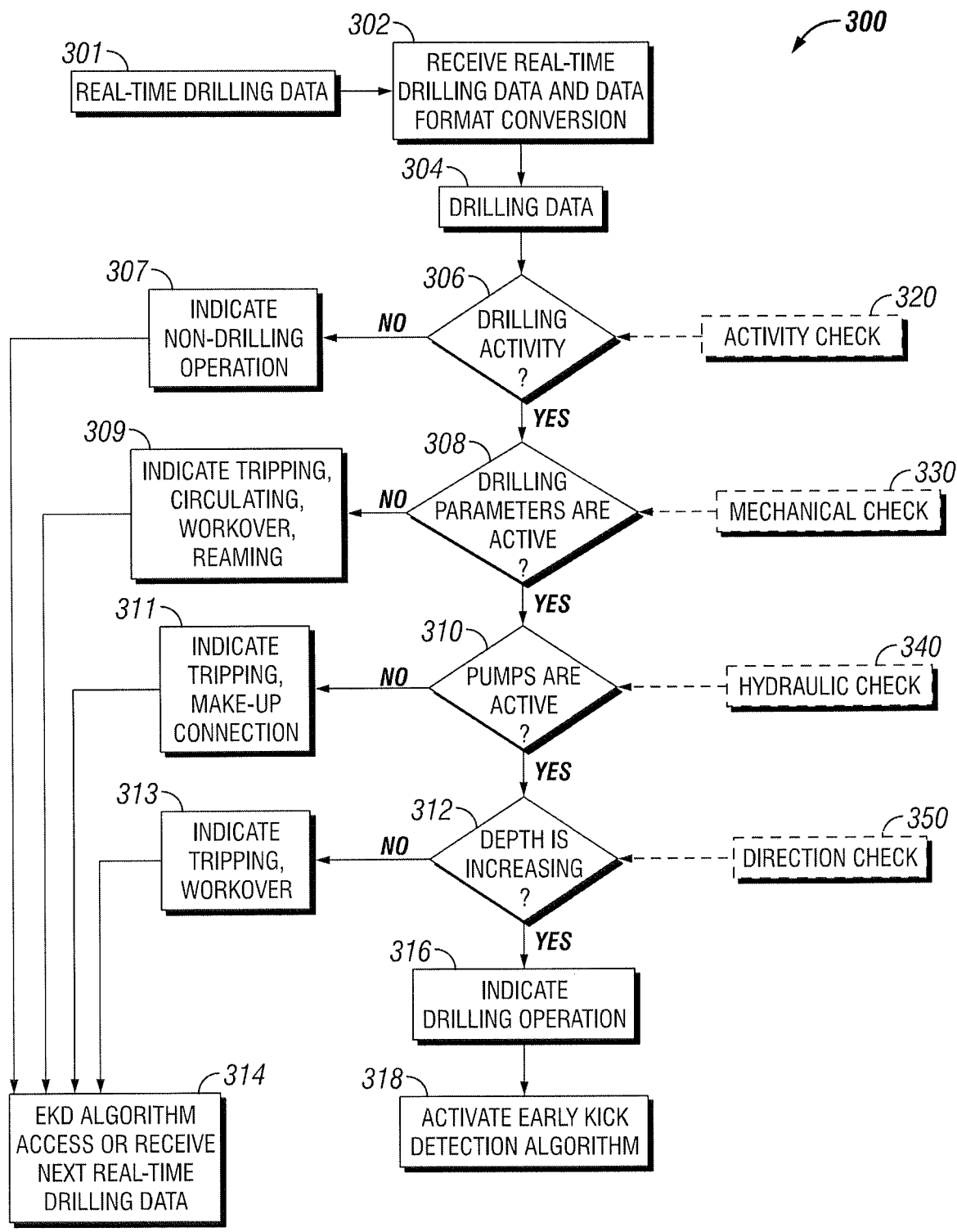
FIG. 8 is a flow chart for detecting an abnormal trend in a drilling operation utilizing real-time data in accordance with one or more aspects of the present invention.

In one or more embodiments, any one or more steps of FIG. 7 may be performed in conjunction (for example, after detecting that a drilling operation is currently taking place) with any one more steps of FIG. 8 for detecting a drilling operation currently being performed. It is appreciated, however, that any processing performed in the method 200 by any appropriate component described herein may occur only uphole, only downhole, or at least some of both (for example, as a distributed process).

When an active drilling operation is detected, a robust early kick detection may be dynamically or adaptively performed using real-time data, substantially real-time data, or any other suitable data. In the event that a kick is detected, an alarm event related to the drilling operation is activated or triggered. An alarm event may comprise sounding an alarm, flashing sources of light, sending one or more notification messages to appropriate personnel, an information handling system or any combination thereof, initiating a shutdown procedure or deactivation process, any other steps or any combination thereof. In one or more embodiments, upon receiving or notification of an alarm event any one or more action to control the kick and to avoid a loss of well control, such as temporarily suspend the drilling operation, may be performed.

At block 201, real-time drilling data is received. At block 202, one or more drilling parameters may be extracted from the received real-time drilling data from block 201. The one or more drilling parameters may include, but are not limited to, a rate of penetration (ROP), weight on bit (WOB), drill string revolutions per minute (RPM) or any combination thereof. The DPG graph of FIG. 3 may be generated based, at least in part, on any one or more drilling parameters. In one or more embodiments, the real-time drilling data, corresponding to data obtained over a given period of time, is received from a logging tool 26 (for example, installed as part of a bottomhole assembly or drill string as described above in FIG. 6) during a drilling operation. In one or more embodiments, the real-time drilling data may be stored in a memory of an information handling system (for, memory 503 of information handling system 500 in FIG. 5) and accessed from the memory for processing. The one or more drilling parameters that are obtained during a drilling operation may relate to a given set of parameters for operating portions of the drilling assembly (for, the drill bit 14, drill string 8, any other component at a site, or any combination thereof). For example, extracting drilling parameters may require obtaining the drilling parameter from a real-time data stream. One or more kick parameters may be calculated for kick detection based, at least in part, on the extracted drilling parameters or the real-time data from the real-time data stream. The drilling parameters may be extracted based, at least in part, on data frequency and noise processing. The real-time data stream may include any one or more measurements or data associated with any one or more of drilling operations including but not limited to temperature, pressure, fluid flow and any one or more drilling operations and any one or more operation parameters including, but not limited to, drilling speed, rotation speed of the drill string, hookload, WOB or any other operation parameter.

At block 204, one or more outlier values associated with the one or more drilling parameters or the one or more kick indicators may be removed to produce cleaned (for example, filtered) early kick detection (EKD) data 205. In one or more embodiments, one or more physical criteria corresponding to a range of expected values for any one or more of the one or more drilling parameters or the one or more kick indicators may be utilized to remove an outlier value. In one or more embodiments, a weight on bit (WOB) parameter with a value of 20,000 pounds (or approximately 9,071.85 kilograms) in a given drilling operation may not be a reasonable value in view of physical criteria associated with the drilling environment, subterranean region or both such as rock strength, and may be removed from the real-time drilling data 201 as an outlier value. Rock strength may correspond to an intrinsic strength of a given formation that comprises rock, which may be based on the composition, process or both of deposition and compaction of the formation. A sufficient WOB value is utilized to overcome the rock strength, along with a drill bit that is capable of performing under this utilized WOB. Another physical criteria may include porosity in which a value for ROP may be higher in a more porous rock formation than in a low-porosity rock formation such that a low value for ROP may be considered an outlier for a highly porous formation. In one or more embodiments, an outlier value for ROP drilling parameter may be discarded when a particular value for the ROP drilling parameter indicates a much greater or lower ROP value than expected in view of one or more other drilling parameters (for example, when the RPM or WOB increases in value, the ROP may increase proportionately in value).

The method 200 determines a value of a kick detection drilling parameter. In one or more embodiments, an indicator for real-time kick detection is based, at least in part, on the kick detection drilling parameter. In one or more embodiments, the kick detection drilling parameter is a drilling parameter for a plurality of trend indicators that may be used to identify abnormal pressure formation and predict abnormal pore pressure. Kicks while drilling are caused in many instances by penetrating through abnormal pressure zones. As a result, a plurality of trend indicators may serve as a good indicator for kick detection while drilling.

According to one or more embodiments, at block 206, one or more trend indicators may be defined or are determined. Although it is easy to inspect the data trend visually, the quantification of the trend is a non-trivial task. In one or more embodiments, four trend indicators are introduced to define the trend of real-time data, for example, real-time data associated with a hydrocarbon drilling operation. The first indicator is the difference of moving average of the original data. For example, in one or more embodiments, four trend indicators may be determined that define the trend for the received real-time drilling data from block 201. A first indicator may be indicative of a difference of moving average of the received real-time drilling data from block 201. The first indicator may be determined as indicated in Equation 1. The $MA_{\alpha,t}$ and $MA_{\beta,t}$ are moving average value at time t with a window length of $\alpha$ and $\beta$, respectively.

$$DMA_t = MA_{\alpha,t} - MA_{\beta,t} (\alpha<\beta) \quad \text{(Equation 1)}$$

DMA is the differential moving average, t is a discrete time point in a time series, MA is a moving average, $\alpha$ is a first range or a first duration of a data window where $\alpha$, t defines a first time window, and $\beta$ is a second range or a second duration of a data window where $\beta$, t defines a second time window. In one or more embodiments the first window and the second window may be based, at least in part, on a sample rate, an environmental factor or condition to be measured (for example, drilling speed where $\alpha$ and $\beta$ may be relatively large, flow rate where data is smooth and data frequency is much higher resulting in a relatively small $\alpha$ and $\beta$,) of the received real-time drilling data from block 201. A positive value for DMA indicates an upward trend, and a negative value of DMA indicates a downward trend.

The second indicator is the slope or is indicative of the slope of a moving linear regression, $MK_t$. The value of $MK_t$ directly represents one or more local trends of the real-time data, with positive values representing positive trends and negative values representing negative trend or rather a positive value for $MK_t$ indicates a positive trend while a negative value for $MK_t$ represents a negative trend. The value of $MK_t$ directly represents the local trends of the received real-time drilling data received at block 201. The data obtained from drilling, for example, from a drilling rig, may be noisy. Usually, the values of $MK_t$ may still be really rough and not applicable for trend analysis. For example, data associated with a hydrocarbon site, for example, drilling environment or site 100 of FIG. 6, may be so noisy that the value of $MK_t$ are not applicable for a trend analysis. A second step of smoothing is recommended to eliminate the effect of local fluctuations due to noise. The smoothing technique may follow a weighted moving average algorithm or a third indicator described as follows where n represents the length of the moving window.

A third trend indicator $MAK_t$ represents an averaged trend in a longer time scale defined by n, length of the moving time window. Both the sign and the absolute value of $MAK_t$ represents the data trend. $MAK_t$ may be determined as indicated in Equation 2, Equation 3 and Equation 4.

$$w_{i,t} = \frac{1}{1 + \exp\left[-2\frac{i - 0.5 + n - t}{0.1}\right]} \quad \text{(Equation 2)}$$

where wi,t represents the weighted moving average, i is a point in the moving time window t and n is the length of the window.

$$i = t - n + 1, t - n + 2, \ldots, t \quad \text{(Equation 3)}$$

$$MAK_t = \frac{\sum_i w_{i,t} * MK_{i,t}}{\sum_i w_{i,t}} \quad \text{(Equation 4)}$$

The fourth trend indicator is defined as the difference of moving slope average ($DMAK_t$) and may be determined as indicated in Equation 5.

$$DMAK_t = MAK_{\alpha,t} - MAK_{\beta,t} (\alpha<\beta) \quad \text{(Equation 5)}$$

The $MAK_{\alpha,t}$ and $MAK_{\beta,t}$ are $MAK_t$ value with a window length of $\alpha$ and $\beta$, respectively. Positive $MAK_t$ values represent or are indicative of increasing acceleration of the data trend and negative $MAK_t$ values represent or are indicative of decreasing acceleration of the data trend.

At block 208, one or more thresholds are set based, at least in part, on DMA and DMAK. The one or more thresholds are indicative of an upper or lower limit of a data trend. In one or more embodiments, the threshold may be based, at least in part, on a capacity of the drilling rig, personnel or both to handle an abnormal condition including, but not limited to, rig type, mud pit size, maximum tolerated kick volume or any other factor. For example, FIG. 1 illustrates a real-time record of two kick indicators for gas kick during a rotating drilling operation plotted for a specified time interval or period. A first kick indicator is a flow parameter group (FPG) which integrates flow related parameters including, but not limited to, flow in, stand pipe pressure and flow out. A second kick indicator is a drilling parameter group which integrates one or more drilling related parameters including, but not limited to, ROP, RPM and WOB. When kick happens, FPG will present an abnormal increasing trend (as indicated by the FPG solid line) and DPG will present a slowing-down accelerating trend (as indicated by the DPG solid line).

At block 210, probability of an abnormal condition is determined. For the abnormal increasing trend detection, DMA is calculated in real-time based on the FPG data as illustrated in FIG. 2. This upward trend may be indicative of an abnormal condition. For the abnormal decreasing trend detection as illustrated in FIG. 3, MK, DMAK and DPG are plotted for a specified time interval or period, for example, approximately one minute (illustrated by the line MAK 1 min) and three minutes (illustrated by the line MAK 3 min). To determine a probability of the occurrence of an abnormal condition an alarm threshold may be set, for example, a DMA alarm threshold. The DMA alarm threshold in FIG. 2 provides an upper limit such that when an increasing DMA trend exceeds or reaches the DMA alarm threshold a kick alarm is triggered and the alarm threshold in FIG. 3 provides a lower limit such that when a decreasing DMAK trend falls below or reaches a DMAK alarm threshold a kick alarm is triggered.

In one or more embodiments, a kick risk index (KRI) may be determined as indicated in Equation 6.

$$KRI = w_d P_d + w_f P_f \qquad \text{(Equation 6)}$$

$P_f$ and $P_d$ represent the probability of abnormal conditions of FPG and DPG, respectively, and $w_d$ and $w_f$ are the weighting factors of $P_f$ and $P_d$, respectively. $P_f$ may be calculated by dividing the DMA value (for example, the DMA value illustrated in FIG. 2) by the DMA alarm threshold, $P_d$ may be calculated by dividing the DMAK value (for example, the DMAK value illustrated in FIG. 3) by the DMAK alarm threshold. In one or more embodiments, the DMA alarm threshold and the DMAK alarm threshold may be predetermined thresholds based, at least in part, on historical trends or historical data, a user input, or any other suitable criteria. At block 212, it is determined if a kick has been detected or meets a threshold likelihood of occurrence based on the determined probability of an abnormal condition from block 210, for example, based on KRI. For example, a probability close to zero may mean or be indicative of a very low chance of kick whereas a probability close to one may mean or be indicative of a kick that is very likely to occur or is occurring.

At block 216, an event is triggered based on block 212. In one or more embodiments, an event may comprise any one or more of triggering an alarm, shut-down or powering-down of a pump, adjusting a valve, redirecting fluid, powering-on a pump, stop rotation of a the drill string or any other mitigation step or altering or adjusting of a drilling operation that prevents a kick. Any one or more events may be implemented manually or automatically.

At block 214, if the kick is not detected at block 212, the method 200 is exited, and a next set of drilling data for a subsequent time period is read. The subsequent time period of the next set of drilling data may be in close temporal proximity to the time in which the method 200 is occurring. In an example, the operations in the method 200 may be repeated for the next set of drilling data. Alternatively or in addition, the operations in a process described further below in FIG. 8 may be performed utilizing this next set of drilling data.

In one or more implementations, a deactivation process may be initiated in response to the alarm event being activated, such as when the kick is detected with a high probability as determined at block 210 of FIG. 7. The deactivation process may include the performance of certain actions such as shutting down operation of the drill string, the mud pump, and/or other portions of the drilling assembly. The deactivation process, in an example, may not begin unless there is no user intervention or input from a human operator to override the deactivation process for a predetermined amount of time after the alarm event is activated (for example, to allow time for the human operator to override the deactivation process since shutting down the drilling operation can be time consuming, disruptive, costly or any combination thereof). For example, a predetermined amount of time is waited for receiving user input from the human operator to override the deactivation process after the alarm event is activated, and after the amount of time has elapsed, the deactivation process is performed if the user input is not received.

Thus, the invention presents a fast, efficient, simple method for automatic abnormal trend detection of real-time drilling data. In one or more embodiments, any one or more of six kinds of abnormal trends may be detected using any one or more aspects of the present disclosure including ramp up, ramp down, slowing-down acceleration, speeding-up acceleration, slowing-down deceleration and speeding-up deceleration. As opposed to previous trend analysis of real-time data, for example, for hydrocarbon operations, that were mainly based on visual observations, the present disclosure provides one or more algorithms that apply one or more quantified trend indicators to achieve the automatic abnormal trend detection in real-time.

FIG. 8 is a flow chart that conceptually illustrates an example method 300 for detecting an abnormal trend or determining a trend analysis in a drilling operation utilizing real-time data in accordance with one or more aspects of the present invention. In one or more embodiments, method 300 may be implemented by one or more information handling systems, such as the processor 638 described in FIG. 9 or FIG. 10, the information handling system 500 described in FIG. 5 or both. FIG. 8, in an example, may be performed in conjunction (for example, prior to performing the robust early kick detection algorithm) with the method 200 described in FIG. 7. It is appreciated, however, that any processing performed in the method 300 by any appropriate component described herein may occur only uphole, only downhole, or at least some of both (for example, distributed processing).

Real-time drilling data 301 may be provided or received. For example, the drilling data 301 may be received from a logging tool (for example, installed as part of a bottomhole assembly or drill string such as logging tool 26 of FIG. 6) during a drilling operation. In another example, the real-time drilling data 301 may be stored in a memory (for example, memory 503 in FIG. 5) during the drilling operation and accessed from the memory for processing. At block 302, the received real-time drilling data 301 may be converted by a reading and data format conversion operation(s) to produce, as output, converted drilling data 304. In an example, the received real-time drilling data may be filtered to remove outlier values related to one or more respective drilling parameters. The method 300 may then perform different types of checks, based on the converted drilling data 304, to determine whether a drilling operation is occurring.

At block 306, it is determined whether the converted drilling data 304 indicates a drilling activity in connection with an activity check 320. In some examples, the converted drilling data includes data that may indicate a drilling activity, such as measured drilling parameters for rate of penetration, weight on bit, and revolutions per minute as discussed above in FIG. 7. If the converted drilling data 304 does not include such drilling parameters, an indication 307 of a non-drilling operation may be provided, and the robust early kick detection method (for example, the method 200 in FIG. 7) is not executed and a next set of real-time drilling data for a subsequent time period is accessed or received at block 314.

At block 308, in response to detecting the drilling activity, it is determined whether at least one drilling parameter is active in connection with a mechanical check 330. A particular drilling parameter, included in the drilling data, may be determined to be inactive if a value for the particular drilling parameter does not indicate that a drilling operation is currently taking place, indicate an erroneous sensor reading or both. For example, a particular drilling parameter is inactive when a weight on bit parameter is insufficient (for example, not great enough to drill through rock in the subterranean region), or when the revolutions per minute of the drill string is too low a value (for example, less than 10

RPM), or when the rate of penetration is greater than a value of zero but substantially close to a value of zero. If the least one drilling parameter is not active, an indication 309 of an operation for tripping (for example, pulling the drill string out of the wellbore or replacing it in the wellbore), circulating (for example, pumping fluid through the entire fluid system, including the wellbore and all the surface tank), workover (for example, repair or stimulation of an existing production well), and/or reaming (for example, enlarging the wellbore) may be provided, and the robust early kick detection process (for example, the method 200 in FIG. 7) is not executed and a next set of real-time drilling data for a subsequent time period is accessed or received at block 314.

At block 310, in response to detecting that at least one drilling parameter is active, it is determined whether at least one pump is active in connection with a hydraulic check 340. One or more hydraulic parameters can be checked to determine whether at least one pump is active such as a pump stroke rate, pump displacement, and/or pump pressure. If the least one pump is not active, an indication 311 of an operation for tripping, and/or make up connection (for example, adding a length of drill pipe to the drill string to continue drilling) may be provided, and the robust early kick detection process (for example, the method 200 in FIG. 7) is not executed and a next set of real-time drilling data for a subsequent time period is accessed or received at block 314.

At block 312, in response to detecting at least one pump is active, it is determined whether depth of the drill string or portion thereof (for example, the drill bit, drill pipe) is increasing in connection with a direction check 350. If the depth is not increasing, an indication 313 of tripping, and/or workover may be provided, and the robust early kick detection process (for example, the method 200 in FIG. 7) is not executed and a next set of real-time drilling data for a subsequent time period is accessed or received at block 314.

At block 316, in response to detecting that the depth is increasing, a drilling operation is indicated as being currently performed. At block 318, in response to the indication that the drilling operation is being currently performed, a robust early kick detection process (for example, the method 200 in FIG. 7) may be performed.

Figure 9:
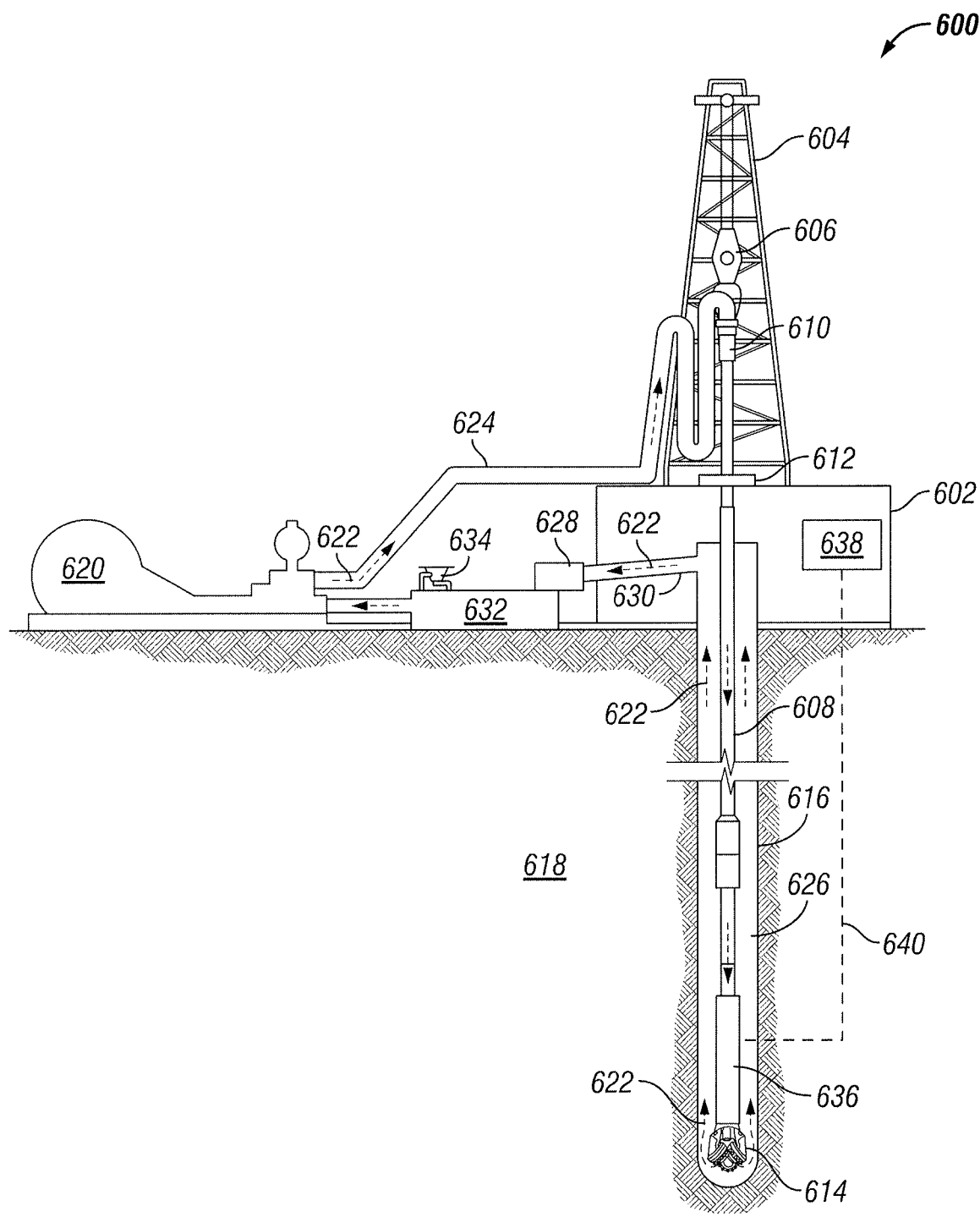
FIG. 9 illustrates an exemplary abnormal trend analysis system in accordance with one or more aspects of the present invention.
Figure 10:
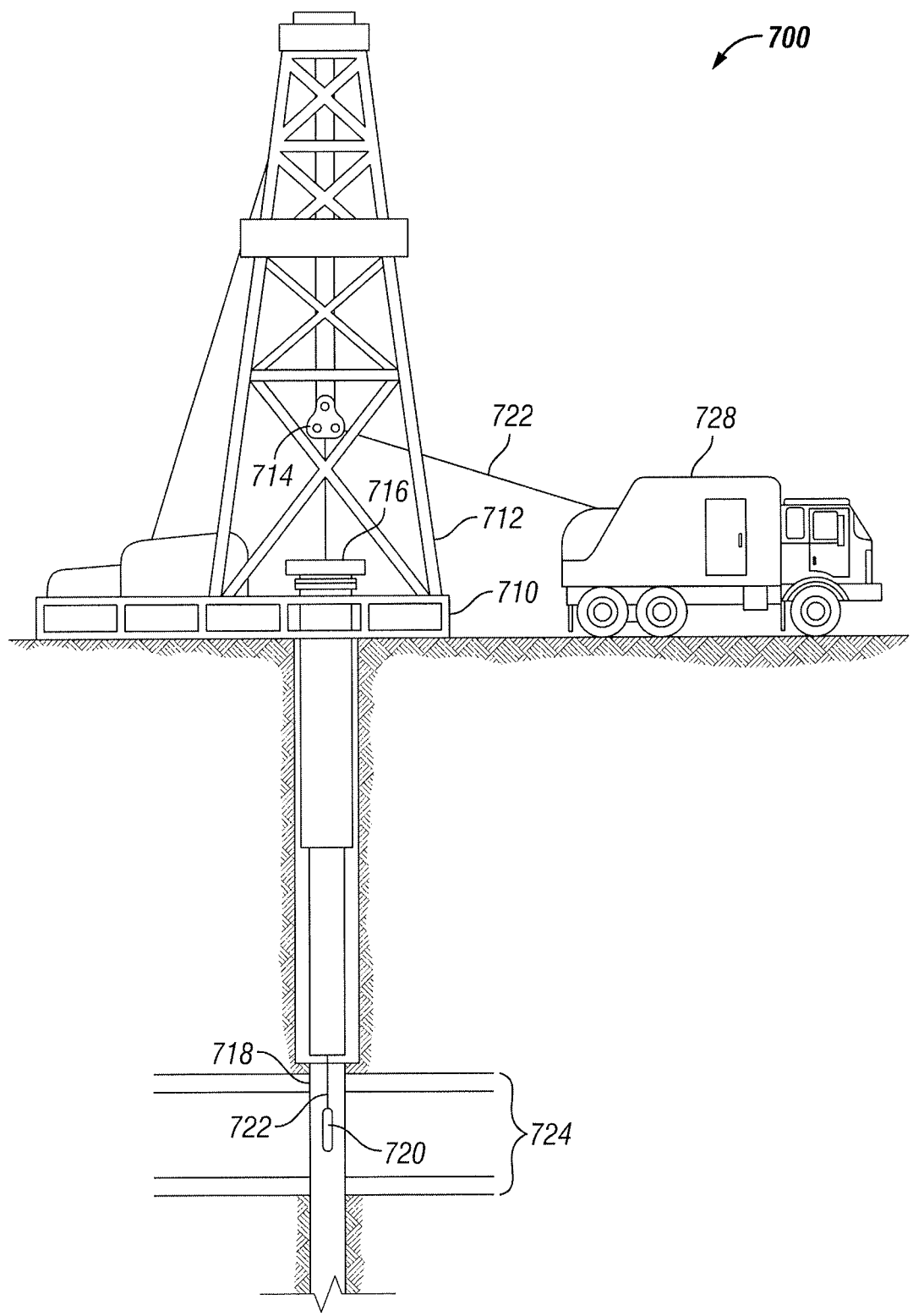
FIG. 10 illustrates an exemplary abnormal trend analysis system in accordance with one or more aspects of the present invention.

The following discussion in FIGS. 9 and 10 relate to examples of a drilling assembly and logging assembly for a given oil or gas well system that may be utilized to implement the robust early kick detection techniques described above.

Oil and gas hydrocarbons may naturally occur in one or more subterranean formations. A subterranean formation containing a hydrocarbon or water may be referred to as a reservoir. A reservoir may be located below a surface on land or off shore. Reservoirs are typically located in the range of a few hundred feet (shallow reservoirs) to a few tens of thousands of feet (ultra-deep reservoirs). To produce a hydrocarbon, a wellbore is drilled into a reservoir or adjacent to a reservoir. The fluid (for example, hydrocarbon or water) produced from the wellbore is called a reservoir fluid.

FIG. 9 illustrates an exemplary drilling assembly 600 for implementing one or more embodiments in accordance with the present invention. It should be noted that while FIG. 9 generally depicts a land-based drilling assembly, those skilled in the art will readily recognize that the principles described herein are equally applicable to subsea drilling operations that employ floating or sea-based platforms and rigs, without departing from the scope of the disclosure.

In one or more implementations, the method 200, the method 300 or both described above may begin at any one or more of before or during the drilling assembly 600 drilling a wellbore 616 penetrating a subterranean formation 618. It is appreciated, however, that any processing performed in the method 200, the method 300 or both by any appropriate component described herein may occur only uphole, only downhole, or at least some of both (for example, distributed processing). As illustrated, the drilling assembly 600 may include a drilling platform 602 that supports a derrick 604 having a traveling block 606 for raising and lowering a drill string 608. The drill string 608 may include, but is not limited to, drill pipe and coiled tubing, as generally known to those skilled in the art. A kelly 610 supports the drill string 608 as it is lowered through a rotary table 612. A drill bit 614 is attached to the distal end of the drill string 608 and is driven either by a downhole motor and/or via rotation of the drill string 608 from the well surface. As the drill bit 614 rotates, it creates the wellbore 616 that penetrates various subterranean formations 618.

A pump 620 (for example, a mud pump) circulates drilling mud 622 through a feed pipe 624 and to the kelly 610, which conveys the drilling mud 622 downhole through the interior of the drill string 608 and through one or more orifices in the drill bit 614. The drilling mud 622 is then circulated back to the surface via an annulus 626 defined between the drill string 608 and the walls of the wellbore 616. At the surface, the recirculated or spent drilling mud 622 exits the annulus 626 and may be conveyed to one or more fluid processing unit(s) 628 via an interconnecting flow line 630. After passing through the fluid processing unit(s) 628, a "cleaned" drilling mud 622 is deposited into a nearby retention pit 632 (for example, a mud pit). While illustrated as being arranged at the outlet of the wellbore 616 via the annulus 626, those skilled in the art will readily appreciate that the fluid processing unit(s) 628 may be arranged at any other location in the drilling assembly 600 to facilitate its proper function, without departing from the scope of the scope of the disclosure.

Chemicals, fluids, additives, and the like may be added to the drilling mud 622 via a mixing hopper 634 communicably coupled to or otherwise in fluid communication with the retention pit 632. The mixing hopper 634 may include, but is not limited to, mixers and related mixing equipment known to those skilled in the art. In other implementations, however, the chemicals, fluids, additives, and the like may be added to the drilling mud 622 at any other location in the drilling assembly 600. In at least one implementation, for example, there may be more than one retention pit 632, such as multiple retention pits 632 in series. Moreover, the retention pit 632 may be representative of one or more fluid storage facilities, units or both where the chemicals, fluids, additives, and the like may be stored, reconditioned, and/or regulated until added to the drilling mud 622.

The processor 638 may be a portion or component of computer hardware used to implement the various illustrative blocks, modules, elements, components, methods, and algorithms described herein. The processor 638 may be configured to execute one or more sequences of instructions, programming stances, or code stored on a non-transitory, computer-readable medium. The processor 638 may comprise, for example, an information handling system 500 of FIG. 5.

Executable sequences described herein may be implemented with one or more sequences of code contained in a memory. In one or more embodiments, such code may be read into the memory from another machine-readable medium. Execution of the sequences of instructions contained in the memory may cause a processor 638 to perform the process steps described herein. One or more processors 638 in a multi-processing arrangement can also be employed to execute instruction sequences in the memory. In addition, hard-wired circuitry can be used in place of or in combination with software instructions to implement various implementations described herein. Thus, the present implementations are not limited to any specific combination of hardware, software or both.

As used herein, a machine-readable medium will refer to any medium that directly or indirectly provides instructions to the processor 638 for execution. A machine-readable medium can take on many forms including, for example, non-volatile media, volatile media, and transmission media. Non-volatile media can include, for example, optical and magnetic disks. Volatile media can include, for example, dynamic memory. Transmission media can include, for example, coaxial cables, wire, fiber optics, and wires that form a bus. Common forms of machine-readable media can include, for example, floppy disks, flexible disks, hard disks, magnetic tapes, other like magnetic media, CD-ROMs, DVDs, other like optical media, punch cards, paper tapes and like physical media with patterned holes, RAM, ROM, PROM, EPROM and flash EPROM.

The drilling assembly 600 may further include a bottom hole assembly (BHA) coupled to the drill string 608 near the drill bit 614. The BHA may comprise various downhole measurement tools such as, but not limited to, measurement-while-drilling (MWD) and logging-while-drilling (LWD) tools, which may be configured to take downhole and/or uphole measurements of the surrounding subterranean formations 618. Along the drill string 608, logging while drilling (LWD) or measuring while drilling (MWD) equipment 636 is included. In one or more implementations, the drilling assembly 600 involves drilling the wellbore 616 while the logging measurements are made with the LWD/MWD equipment 636. More generally, the methods described herein involve introducing a logging tool into the wellbore that is capable of determining wellbore parameters, including mechanical properties of the formation. The logging tool may be an LWD logging tool, a MWD logging tool, a wireline logging tool, slickline logging tool, and the like. Further, it is understood that any processing performed by the logging tool may occur only uphole, only downhole, or at least some of both (i.e., distributed processing).

According to the present disclosure, the LWD/MWD equipment 636 may include a stationary acoustic sensor and a moving acoustic sensor used to detect the flow of fluid flowing into and/or adjacent the wellbore 616. In an example, the stationary acoustic sensor may be arranged about the longitudinal axis of the LWD/MWD equipment 636, and, thus, of the wellbore 616 at a predetermined fixed location within the wellbore 616. The moving acoustic sensor may be arranged about the longitudinal axis of the LWD/MWD equipment 636, and, thus, of the wellbore 616, and is configured to move along the longitudinal axis of the wellbore 616. However, the arrangement of the stationary acoustic sensor and the moving acoustic sensor is not limited thereto and the acoustic sensors may be arranged in any configuration as required by the application and design.

The LWD/MWD equipment 636 may transmit the measured data to a processor 638 at the surface wired or wirelessly. Transmission of the data is generally illustrated at line 640 to demonstrate communicable coupling between the processor 638 and the LWD/MWD equipment 636 and does not necessarily indicate the path to which communication is achieved. The stationary acoustic sensor and the moving acoustic sensor may be communicably coupled to the line 640 used to transfer measurements and signals from the BHA to the processor 638 that processes the acoustic measurements and signals received by acoustic sensors (for example, stationary acoustic sensor, moving acoustic sensor) and/or controls the operation of the BHA. In the subject technology, the LWD/MWD equipment 636 may be capable of logging analysis of the subterranean formation 618 proximal to the wellbore 616.

In some implementations, part of the processing may be performed by a telemetry module (not shown) in combination with the processor 638. For example, the telemetry module may pre-process the individual sensor signals (for example, through signal conditioning, filtering, and/or noise cancellation) and transmit them to a surface data processing system (for example, the processor 638) for further processing. It is appreciated that any processing performed by the telemetry module may occur only uphole, only downhole, or at least some of both (for example, distributed processing).

In various implementations, the processed acoustic signals are evaluated in conjunction with measurements from other sensors (for example, temperature and surface well pressure measurements) to evaluate flow conditions and overall well integrity. The telemetry module may encompass any known means of downhole communication including, but not limited to, a mud pulse telemetry system, an acoustic telemetry system, a wired communications system, a wireless communications system, or any combination thereof. In certain implementations, some or all of the measurements taken by the stationary acoustic sensor and the moving acoustic sensor may also be stored within a memory associated with the acoustic sensors or the telemetry module for later retrieval at the surface upon retracting the drill string 608.

FIG. 10 illustrates a logging assembly 700 having a wireline system suitable for implementing the methods described herein. As illustrated, a platform 710 may be equipped with a derrick 712 that supports a hoist 714. Drilling oil and gas wells, for example, are commonly carried out using a string of drill pipes connected together so as to form a drilling string that is lowered through a rotary table 716 into a wellbore 718. Here, it is assumed that the drilling string has been temporarily removed from the wellbore 718 to allow a logging tool 720 (and/or any other appropriate wireline tool) to be lowered by wireline 722, slickline, coiled tubing, pipe, downhole tractor, logging cable, and/or any other appropriate physical structure or conveyance extending downhole from the surface into the wellbore 718. Typically, the logging tool 720 is lowered to a region of interest and subsequently pulled upward at a substantially constant speed. During the upward trip, instruments included in the logging tool 720 may be used to perform measurements on the subterranean formation 724 adjacent the wellbore 718 as the logging tool 720 passes by. Further, it is understood that any processing performed by the logging tool 720 may occur only uphole, only downhole, or at least some of both (for example, distributed processing).

The logging tool 720 may include one or more wireline instrument(s) that may be suspended into the wellbore 718 by the wireline 722. The wireline instrument(s) may include the stationary acoustic sensor and the moving acoustic sensor, which may be communicably coupled to the wireline 722. The wireline 722 may include conductors for transporting power to the wireline instrument and also facilitate communication between the surface and the wireline instrument. The logging tool 720 may include a mechanical component for causing movement of the moving acoustic sensor. In some implementations, the mechanical component may need to be calibrated to provide a more accurate mechanical motion when the moving acoustic sensor is being repositioned along the longitudinal axis of the wellbore 718.

The acoustic sensors (for example, the stationary acoustic sensor, the moving acoustic sensor) may include electronic sensors, such as hydrophones, piezoelectric sensors, piezoresistive sensors, electromagnetic sensors, accelerometers, or the like. In other implementations, the acoustic sensors may comprise fiber optic sensors, such as point sensors (for example, fiber Bragg gratings, etc.) distributed at desired or predetermined locations along the length of an optical fiber. In yet other implementations, the acoustic sensors may comprise distributed acoustic sensors, which may also use optical fibers and permit a distributed measurement of local acoustics at any given point along the fiber. In still other implementations, the acoustic sensors may include optical accelerometers or optical hydrophones that have fiber optic cablings.

Additionally or alternatively, in an example (not explicitly illustrated), the acoustic sensors may be attached to or embedded within the one or more strings of casing lining the wellbore 718, the wall of the wellbore 718 or both at an axially spaced pre-determined distance.

A logging facility 728, shown in FIG. 10 as a truck, may collect measurements from the acoustic sensors (for example, the stationary acoustic sensor, the moving acoustic sensor), and may include the processor 638 for controlling, processing, storing, and/or visualizing the measurements gathered by the acoustic sensors. The processor 638 may be communicably coupled to the wireline instrument(s) by way of the wireline 722. Alternatively, the measurements gathered by the logging tool 720 may be transmitted (wired or wirelessly) or physically delivered to computing facilities off-site where the methods and processes described herein may be implemented.

As discussed herein, different approaches can be implemented in various environments in accordance with the described embodiments. For example, FIG. 11 illustrates a schematic diagram of an example of an environment 1100 for implementing aspects in accordance with various embodiments. As will be appreciated, although a client-server based environment is used for purposes of explanation, different environments may be used, as appropriate, to implement various embodiments. The system includes an electronic client device 1102, which can include any appropriate device operable to send and receive requests, messages or information over an appropriate network 1104 and convey information back to a user of the device. Examples of such client devices include personal computers, cell phones, handheld messaging devices, laptop computers, set-top boxes, personal data assistants, electronic book readers and the like.

The network 1104 may include any appropriate network, including an intranet, the Internet, a cellular network, a local area network or any other such network or combination thereof. The network 1104 could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Computing over the network 904 can be enabled via wired or wireless connections and combinations thereof. In this example, the network includes the Internet, as the environment includes a server 1106 for receiving requests and serving content in response thereto, although for other networks, an alternative device serving a similar purpose could be used, as would be apparent to one of ordinary skill in the art.

The client device 1102 may represent the logging tool 720 of FIG. 10 and the server 1106 may represent the processor 638 of FIG. 9 in some implementations, or the client device 1102 may represent the processor 638 and the server 1106 may represent the off-site computing facilities in other implementations.

The server 1106 typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via computing links, using one or more computer networks or direct connections. However, it will be appreciated by those of ordinary skill in the art that such a system could operate equally well in a system having fewer or a greater number of components than are illustrated in FIG. 11. Thus, the depiction of the environment 1100 in FIG. 11 should be taken as being illustrative in nature and not limiting to the scope of the disclosure.

In one or more embodiments, a method for detecting an abnormal trend in a drilling operation comprises receiving real-time drilling data comprising a plurality of drilling parameters measured during a drilling operation, determining one or more trend indicators based, at least in part, on the received real-time drilling data, wherein determining the one or more trend indicators comprises, determining a first trend indicator, wherein the first trend indicator comprises a moving average of the real-time drilling data, determining a second trend indicator, wherein the second trend indicator comprises a slope of moving linear regression, determining a third trend indicator, wherein the third trend indicator comprises an average trend and determining a fourth trend indicator, wherein the fourth trend indicator comprises a difference of moving slope average and triggering an alarm based, at least in part, on a threshold and the trend analysis. In one or more embodiments, the method further comprises altering a drilling operation based, at least in part, on the trend analysis. In one or more embodiments, wherein determining the first indicator comprises determining: $DMA_t = MA_{\alpha,t} - MA_{\beta,t}$, wherein $\alpha < \beta$), and wherein $MA_{\alpha,t}$ and $MA_{\beta,t}$ are moving average value at time t with a window length of $\alpha$ and $\beta$, respectively. In one or more embodiments, the method further comprises wherein determining the second indicator comprises determining $MK_t$, wherein $MK_t$ represents one or more local trends of the received drilling data, and wherein positive values represent positive trends and negative values represent negative trends. In one or more embodiments, the method further comprises wherein determining the third indicator comprises determining:

$$MAK_t = \frac{\sum_i w_{i,t} * MK_{i,t}}{\sum_i w_{i,t}},$$

wherein $$w_{i,t} = \frac{1}{1 + \exp\left[-2\frac{i - 0.5 + n - t}{0.1}\right]},$$

wherein i=t−n+1, t−n+2, . . . , t, and wherein n defines a time scale. In one or more embodiments, the method further comprises wherein determining the fourth trend indicator comprises determining DMAKt=MAKα,t−MAKβ,t (α<β), wherein MAKα,t and MAKβ,t are MAKt at time t with a window length of a and 3, respectively. In one or more embodiments, the method further comprises determining a kick risk index, wherein determining the kick risk index comprises determining KRI=$w_d P_d + w_f P_f$, wherein Pf and Pd represent probability of abnormal conditions of flow parameter group and drilling parameter group, respectively, and wherein wd and wf are weighting factors of Pf and Pd, respectively.

In one or more embodiments, A non-transitory computer-readable medium storing one or more instructions that, when executed by a processor, cause the processor to: receive real-time drilling data, determine one or more trend indicators based, at least in part, on the received real-time drilling data, wherein determining the one or more trend indicators comprise: determining a first trend indicator, wherein the first trend indicator comprises a moving average of the real-time drilling data, determining a second trend indicator, wherein the second trend indicator comprises a slope of moving linear regression, determining a third trend indicator, wherein the third trend indicator comprises an average trend and determining a fourth trend indicator, wherein the fourth trend indicator comprises a difference of moving slope average and determine a trend analysis based, at least in part, on the one or more trend indicators and trigger an alarm based, at least in part, on a threshold and the trend analysis. In one or more embodiments, the computer-readable medium further comprises wherein determining the first indicator comprises determining DMA$_t$=MA$_{\alpha,t}$−MA$_{\beta,t}$, wherein α<β, wherein MA$_{\alpha,t}$ and MA$_{\beta,t}$ are moving average value at time t with a window length of α and β, respectively. In one or more embodiments, the computer-readable medium further comprises wherein determining the second indicator comprises determining MK$_t$, wherein MK$_t$ represents one or more local trends of the received drilling data, and wherein positive values represent positive trends and negative values represent negative trends. In one or more embodiments, the computer-readable medium further comprises wherein determining the third indicator comprises determining:

$$MAK_t = \frac{\sum_i w_{i,t} * MK_{i,t}}{\sum_i w_{i,t}},$$

wherein $$w_{i,t} = \frac{1}{1 + \exp\left[-2\frac{i - 0.5 + n - t}{0.1}\right]},$$

wherein i=t−n+1, t−n+2, . . . , t, and wherein n defines a time scale. In one or more embodiments, the computer-readable medium further comprises wherein determining the fourth trend indicator comprises determining DMAK$_t$=MAK$_{\alpha,t}$−MAK$_{\beta,t}$ (α<β), wherein MAK$_{\alpha,t}$ and MAK$_{\beta,t}$ are MAK$_t$ at time t with a window length of α and β, respectively. In one or more embodiments, the computer-readable medium further comprises wherein the one or more instructions that, when executed by a processor, further cause the processor to determine a kick risk index, wherein determining the kick risk index comprises determining KRI=$w_d P_d + w_f P_f$, wherein P$_f$ and P$_d$ represent probability of abnormal conditions of flow parameter group and drilling parameter group, respectively, and wherein w$_d$ and w$_f$ are weighting factors of P$_f$ and P$_d$, respectively.

In one or more embodiments, an information handling system comprising a memory, a processor coupled to the memory, wherein the memory comprises one or more instructions executable by the processor to: receive real-time drilling data, determine one or more trend indicators based, at least in part, on the received real-time drilling data, wherein determining the one or more trend indicators comprises: determining a first trend indicator, wherein the first trend indicator comprises a moving average of the real-time drilling data, determining a second trend indicator, wherein the second trend indicator comprises a slope of moving linear regression, determining a third trend indicator, wherein the third trend indicator comprises an average trend and determining a fourth trend indicator, wherein the fourth trend indicator comprises a difference of moving slope average, determine a trend analysis based, at least in part, on the one or more trend indicators and trigger an alarm based, at least in part, on a threshold and the trend analysis. In one or more embodiments, the information handling system further comprises wherein determining the first indicator comprises determining: DMA$_t$=MA$_{\alpha,t}$−MA$_{\beta,t}$ (α<β), wherein MA$_{\alpha,t}$ and MA$_{\beta,t}$ are moving average value at time t with a window length of α and β, respectively. In one or more embodiments, the information handling system further comprises wherein determining the second indicator comprises determining MK$_t$, wherein MK$_t$ represents one or more local trends of the received drilling data, and wherein positive values represent positive trends and negative values represent negative trends. In one or more embodiments, the information handling system further comprises wherein determining the third indicator comprises determining:

$$MAK_t = \frac{\sum_i w_{i,t} * MK_{i,t}}{\sum_i w_{i,t}},$$

wherein $$w_{i,t} = \frac{1}{1 + \exp\left[-2\frac{i - 0.5 + n - t}{0.1}\right]},$$

wherein i=t−n+1, t−n+2, ..., t, and wherein n defines a time scale. In one or more embodiments, the information handling system further comprises determining the fourth trend indicator comprises determining $DMAK_t = MAK_{\alpha,t} - MAK_{\beta,t}$ ($\alpha < \beta$), wherein $MAK_{\alpha,t}$ and $MAK_{\beta,t}$ are $MAK_t$ at time t with a window length of $\alpha$ and $\beta$, respectively. In one or more embodiments, the information handling system further comprises wherein the one or more instructions further executable by the processor to determine a kick risk index, wherein determining the kick risk index comprises determining $KRI = w_d P_d + w_f P_f$, wherein $P_f$ and $P_d$ represent probability of abnormal conditions of flow parameter group and drilling parameter group, respectively, and wherein $w_d$ and $w_f$ are weighting factors of $P_f$ and $P_d$, respectively.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee.

A number of examples have been described. Nevertheless, it will be understood that various modifications can be made. Accordingly, other implementations are within the scope of the following claims.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A method for detecting an abnormal trend in a drilling operation, comprising:
receiving real-time drilling data comprising a plurality of drilling parameters measured during the drilling operation;
determining one or more trend indicators based, at least in part, on the received real-time drilling data, wherein determining the one or more trend indicators comprises:
determining a first trend indicator, wherein the first trend indicator comprises a moving average of the real-time drilling data;
determining a second trend indicator, wherein the second trend indicator comprises a slope of moving linear regression;
determining a third trend indicator, wherein the third trend indicator comprises an average trend, wherein determining the third trend indicator comprises determining:

$$MAK_t = \frac{\sum_i w_{i,t} * MK_{i,t}}{\sum_i w_{i,t}}, \text{ wherein}$$

$$w_{i,t} = \frac{1}{1 + \exp\left[-2\frac{i - 0.5 + n - t}{0.1}\right]}, \text{ wherein}$$

i=t−n+1, t−n+2, . . . , t, and wherein n defines a time scale; and
determining a fourth trend indicator, wherein the fourth trend indicator comprises a difference of moving slope average;
determining a trend analysis based, at least in part, on the one or more trend indicators; and
triggering an alarm based, at least in part, on a threshold and the trend analysis.

2. The method of claim 1, further comprising altering the drilling operation based, at least in part, on the trend analysis.

3. The method of claim 1, wherein determining the first indicator comprises determining:
$DMA_t=MA_{\alpha,t}-MA_{\beta,t}$, wherein, $\alpha<\beta$, and wherein $MA_{\alpha,t}$ and $MA_{\beta,t}$ are moving average value at time t with a window length of $\alpha$ and $\beta$, respectively.

4. The method of claim 1, wherein determining the second indicator comprises determining $MK_t$, wherein $MK_t$ represents one or more local trends of the received drilling data, and wherein positive values represent positive trends and negative values represent negative trends.

5. The method of claim 1, wherein determining the fourth trend indicator comprises determining $DMAK_t=MAK_{\alpha,t}-MAK_{\alpha,t}$ ($\alpha<\beta$), wherein $MAK_{\alpha,t}$ and $MAK_{\alpha,t}$ are $MAK_t$ at time t with a window length of $\alpha$ and $\beta$, respectively.

6. The method of claim 1, further comprising:
determining a kick risk index, wherein determining the kick risk index (KRI) comprises determining $KRI=w_d P_d+w_f P_f$, wherein $P_f$ and $P_d$ represent probability of abnormal conditions of flow parameter group and drilling parameter group, respectively, and wherein $w_d$ and $w_f$ are weighting factors of $P_f$ and $P_d$, respectively, wherein triggering the alarm is based, at least in part, on the kick risk index.

7. The method of claim 1, wherein the threshold is based, at least in part, on one or more of user input and historical data.

8. A non-transitory computer-readable medium storing one or more instructions that, when executed by a processor, cause the processor to:
receive real-time drilling data;
determine one or more trend indicators based, at least in part, on the received real-time drilling data, wherein determining the one or more trend indicators comprises:
determining a first trend indicator, wherein the first trend indicator comprises a moving average of the real-time drilling data;
determining a second trend indicator, wherein the second trend indicator comprises a slope of moving linear regression;
determining a third trend indicator, wherein the third trend indicator comprises an average trend, wherein determining the third trend indicator comprises determining:

$$MAK_t = \frac{\sum_i w_{i,t} * MK_{i,t}}{\sum_i w_{i,t}}, \text{ wherein}$$

$$w_{i,t} = \frac{1}{1 + \exp\left[-2\frac{i - 0.5 + n - t}{0.1}\right]}, \text{ wherein}$$

i=t−n+1, t−n+2, . . . , t, and wherein n defines a time scale; and
determining a fourth trend indicator, wherein the fourth trend indicator comprises a difference of moving slope average;
determine a trend analysis based, at least in part, on the one or more trend indicators; and
trigger an alarm based, at least in part, on a threshold and the trend analysis.

9. The computer-readable medium of claim 8, wherein determining the first indicator comprises determining:
$DMA_t=MA_{\alpha,t}-MA_{\beta,t}$, wherein $\alpha<\beta$, wherein $MA_{\alpha,t}$ and $MA_{\beta,t}$ are moving average value at time t with a window length of $\alpha$ and $\beta$, respectively.

10. The computer-readable medium of claim 8, wherein determining the second indicator comprises determining $MK_t$, wherein $MK_t$ represents one or more local trends of the received drilling data, and wherein positive values represent positive trends and negative values represent negative trends.

11. The computer-readable medium of claim 8, wherein determining the fourth trend indicator comprises determining $DMAK_t=MAK_{\alpha,t}-MAK_{\alpha,t}$ ($\alpha<\beta$), wherein $MAK_{\alpha,t}$ and $MAK_{\beta,t}$ are $MAK_t$ at time t with a window length of $\alpha$ and $\beta$, respectively.

12. The computer-readable medium of claim 8, wherein the one or more instructions that, when executed by a processor, further cause the processor to determine a kick risk index, wherein determining the kick risk index (KRI) comprises determining $KRI=w_d P_d+w_f P_f$, wherein $P_f$ and $P_d$ represent probability of abnormal conditions of flow parameter group and drilling parameter group, respectively, and wherein $w_d$ and $w_f$ are weighting factors of $P_f$ and $P_d$, respectively, and wherein triggering the alarm is based, at least in part, on the kick risk index, and wherein triggering the alarm is based, at least in part, on the kick risk index.

13. An information handling system comprising:
a memory;
a processor coupled to the memory, wherein the memory comprises one or more instructions executable by the processor to:
receive real-time drilling data;
determine one or more trend indicators based, at least in part, on the received real-time drilling data, wherein determining the one or more trend indicators comprises:
   determining a first trend indicator, wherein the first trend indicator comprises a moving average of the real-time drilling data;
   determining a second trend indicator, wherein the second trend indicator comprises a slope of moving linear regression;
   determining a third trend indicator, wherein the third trend indicator comprises an average trend, wherein determining the third indicator comprises determining:

$$MAK_t = \frac{\sum_i w_{i,t} * MK_{i,t}}{\sum_i w_{i,t}}, \text{ wherein}$$

$$w_{i,t} = \frac{1}{1 + \exp\left[-2\frac{i - 0.5 + n - t}{0.1}\right]}, \text{ wherein}$$

i=t−n+1, t−n+2, . . . , t, and wherein n defines a time scale; and determining a fourth trend indicator, wherein the fourth trend indicator comprises a difference of moving slope average;
determine a trend analysis based, at least in part, on the one or more trend indicators; and
trigger an alarm based, at least in part, on a threshold and the trend analysis.

14. The information handling system of claim 13, wherein determining the first indicator comprises determining:
$DMA_t = MA_{\alpha,t} - MA_{\beta,t}$ ($\alpha < \beta$), wherein $MA_{\alpha,t}$ and $MA_{\beta,t}$ are moving average value at time t with a window length of $\alpha$ and $\beta$, respectively.

15. The information handling system of claim 13, wherein determining the second indicator comprises determining $MK_t$, wherein $MK_t$ represents one or more local trends of the received drilling data, and wherein positive values represent positive trends and negative values represent negative trends.

16. The information handling system of claim 13, wherein determining the fourth trend indicator comprises determining $DMAK_t = MAK_{\alpha,t} - MAK_{\beta,t}$ ($\alpha < \beta$), wherein $MAK_{\alpha,t}$ and $MAK_{\beta,t}$ are $MAK_t$ at time t with a window length of $\alpha$ and $\beta$, respectively.

17. The information handling system of claim 13, wherein the one or more instructions further executable by the processor to determine a kick risk index, wherein determining the kick risk index (KRI) comprises determining $KRI = w_d P_d + w_f P_f$, wherein $P_f$ and $P_d$ represent probability of abnormal conditions of flow parameter group and drilling parameter group, respectively, and wherein $w_d$ and $w_f$ are weighting factors of $P_f$ and $P_d$, respectively, and wherein the triggering the alarm is based, at least in part, on the kick risk index.

* * * * *